(12) United States Patent
Suzuki et al.

(10) Patent No.: US 6,487,508 B1
(45) Date of Patent: Nov. 26, 2002

(54) ENERGY SUPPLY SYSTEM AND OPERATION METHOD THEREOF

(75) Inventors: Hiroaki Suzuki, Hitachiota (JP); Osamu Yokomizo, Tokyo (JP); Tetsuo Horiuchi, Hitachi (JP); Naoyuki Yamada, Hitachinaka (JP); Mamoru Morita, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 177 days.

(21) Appl. No.: 09/584,320

(22) Filed: May 31, 2000

(51) Int. Cl.$^7$ ............................................. G01R 21/06
(52) U.S. Cl. ........................................ 702/61; 700/300
(58) Field of Search .............................. 702/61, 66, 62, 702/64, 65, 99, 130, 182; 374/1, 100, 189, 109; 700/9, 17, 19, 276, 277, 291, 297, 300

(56) References Cited

U.S. PATENT DOCUMENTS

| | | | |
|---|---|---|---|
| 5,924,486 A | * 7/1999 | Ehlers et al. | 165/238 |
| 5,930,773 A | * 7/1999 | Crooks et al. | 705/30 |
| 6,311,105 B1 | * 10/2001 | Budike, Jr. | 700/291 |

FOREIGN PATENT DOCUMENTS

| | | |
|---|---|---|
| JP | 6-131004 | 5/1994 |
| JP | 6-231132 | 8/1994 |
| JP | 6-236202 | 8/1994 |

* cited by examiner

*Primary Examiner*—Marc S. Hoff
*Assistant Examiner*—Edward Raymond
(74) *Attorney, Agent, or Firm*—Mattingly, Stanger & Malur, P.C.

(57) ABSTRACT

An energy supply system includes at least two devices selected from a device for generating electric power, a device for heating a heat conveying medium to an atmospheric temperature or higher and a device for cooling a heat conveying medium to the atmospheric temperature or lower; a device for supplying at least two selected from electric power, heat of atmospheric temperature or higher and cold of atmospheric temperature or lower to a plurality of customers; a device for measuring supply quantities of electric power, heat and cold, supplied to the plurality of customers; a device for calculating usage charges for electric power, heat and cold, consumed by each of the customers on the basis of the supply quantities; and a device for settling the usage charges. One enterprise entity manages these activities.

16 Claims, 17 Drawing Sheets

(a) EXAMPLE 1 OF DAILY MANAGEMENT OF POWER (b) EXAMPLE 1 OF DAILY MANAGEMENT OF HEAT (a) EXAMPLE 2 OF DAILY MANAGEMENT OF POWER (b) EXAMPLE 2 OF DAILY MANAGEMENT OF HEAT

US 6,487,508 B1

ENERGY SUPPLY SYSTEM AND OPERATION METHOD THEREOF

BACKGROUND OF THE INVENTION

The present invention relates to an energy supply system and, more particularly, to a system which is able to effectively supply energy to a specific area and a control method of the system.

Hitherto, it is general that individual enterprise entities independently supply a main energy source such as electric power, gas, etc. In a partial area, supply of heat and cold, using electric power and gas as an energy source, so-called a distinct heating and cooling enterprise is conducted.

However, this enterprise also is run independently of an enterprise supplying the other energy source. Further, there also is an enterprise entity which introduces a co-generation system in view of improvement of the whole thermal efficiency which uses generated power for home consumption and supplies heat by using a part of exhaust heat. However for the entity a main object is to reduce a power generation cost, and an enterprise to supply widely the generated power in the area is not conducted. An example of a conventional technique relating to the co-generation system is disclosed in JP A 6-131004 in which a plurality of co-generation systems are used, and an energy supply means and a energy circulating means are controlled so that a cost of energy to be supplied to a plurality of energy consumption areas will be minimum. However, in the technique it is not considered to more efficiently do energy business by measuring a quantity of energy consumption of a customer and lump-sum charging. Further, since a main energy source is supplied by different enterprise entities, it is general that the quantities of consumption are measured independently and individually charged. However, there is proposed a system in which the consumption quantities of electricity, water and gas are measured and totally charged for residents of office buildings, etc., as in JP A 6-631132, for example, however, in this technique it is not considered to feed those measured values back to the energy supply system.

The above-mentioned conventional techniques have a problem that the energy sources are supplied by different enterprise entities, so that it-is difficult to supply combination energy optimum for a power-generation cost or a load on environment to energy-consuming customers in a specific area. Further, consumption quantities of energy are individually measured and charged, so that time is required for the treatment thereof and it is difficult to totally acknowledge energy consumption of respective customers. Although there are conventional techniques solving partially those problems, there was not anything to make efficient the energy supply business and realize as new business, by solving those problems.

SUMMARY OF THE INVENTION

An object of the present invention is to provide an energy supply system which efficiently supplies energy customers and makes it easy to synthetically keep trace of energy consumption of respective customers.

An energy supply system according to the present invention to achieve the above-mentioned object comprises: at least two means selected from means for generating electric power, means for heating a heat conveying medium to an atmospheric temperature or higher and means for cooling a heat conveying medium to the atmospheric temperature or lower; means for supplying at least two selected from electric power, heat of atmospheric temperature or higher and cold of atmospheric temperature or lower to a plurality of customers; means for measuring quantities of electric power, heat and cold, supplied to each of a plurality of customers; means for calculating usage charges for electric power, heat and cold, consumed by each of the customers on the basis of the supply quantities; and means for settling the usage charges.

Further, a method of operating an energy supply system having at least two means selected from means for generating electric power, means for heating a heat conveying medium to an atmospheric temperature or higher and means for cooling a heat conveying medium to the atmospheric temperature or lower, and means for supplying at least two selected from electric power, heat of atmospheric temperature or higher and cold of atmospheric temperature or lower to a plurality of customers, comprises: measuring amounts of electric power, heat and cold, supplied to a plurality of customers; calculating a usage charge for each customer on the basis of usage; and settling the usage charge.

BRIEF DESCRIPTION OF THE DRAWINGS

FIG. 15 is a block diagram for explanation of a system suitable for charging a battery of an electric vehicle or the like.

DESCRIPTION OF EMBODIMENTS OF THE INVENTION

Figure 1:
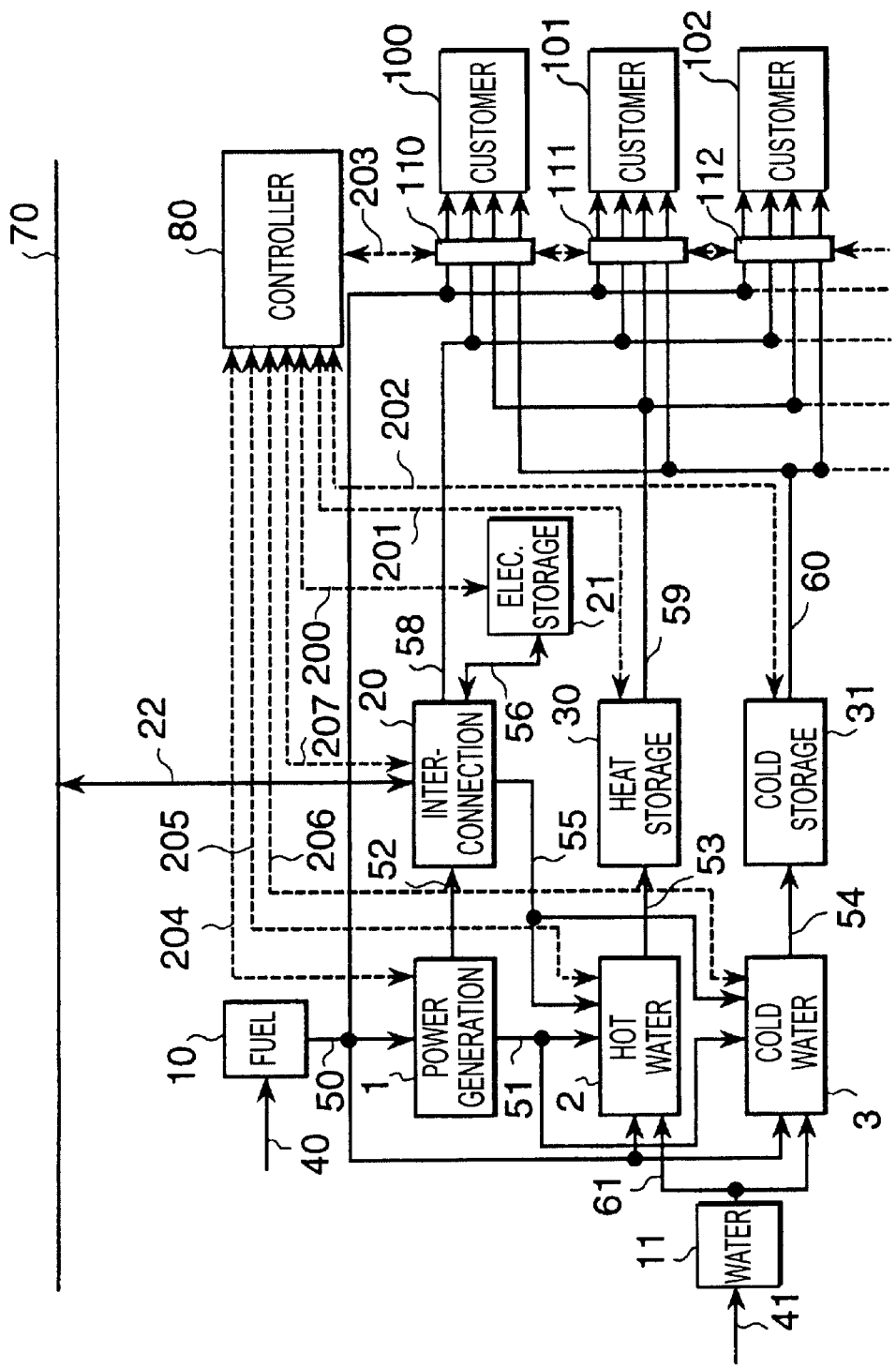
FIG. 1 is a schematic diagram for explanation of a system which is made to manage main energy supply to a specific area by one enterprise entity and made it possible to measure a quantity of supply for each customer.

Hereunder, an embodiment of the present invention is described, referring to FIG. 1.

The present embodiment is made so that main energy, for example, electric power, hot water that a fluid as a heat conveying medium is heated to an atmospheric temperature or higher, cold water that a fluid as a heat conveying medium is cooled to the atmospheric temperature or lower and gas as fuel for obtaining a high temperature through combustion thereof is supplied to a specific area by one enterprise entity, and so that a supply quantity of the energy can be measured or metered for each of a plurality of customers within the specific area.

In a fuel tank 10, for example, natural gas is stored, and when necessary, the fuel is made up by a supply means 40 composed of a pump, piping, etc. for example. As for make-up of fuel, it is desirable to construct its apparatus so as to decide automatically make-up timing of the fuel or automatically give out an order by providing means for measuring or metering the remaining quantity of fuel in the fuel tank 10, for example, a liquid level meter. The fuel is supplied to electric power generation equipment 1, hot-water supply apparatus 2, cold water supply apparatus 3 and a plurality of customers 100, 101, 102 by using supply means 50 composed of a pump and piping, for example. It is matter of course that the number of customers to be supplied with the energy are not limited to three.

In the electric power generation equipment 1, natural gas, for example, is used as fuel, and a gas engine is used as a power station. The electric power generated in the power generation equipment 1 is transmitted to a system interconnection apparatus 20 by supply means 52 such as electric lines, to the hot-water supply apparatus 2 and cold-water supply apparatus 3 by supply means 55 and to the plurality of customers 100, 101, 102 by supply means 58. The electric power generation equipment 1 is made so that its output is 100V or 200, for example, and particularly, for the electric power generation equipment 1 it is desirable not to necessitate additional equipment such as a transformer or the like. Excessive power is supplied to electricity storage equipment 21 using sodium-sulphur batteries, for example.

The system interconnection apparatus 20 cooperates with power-transmission lines 70 by system cooperation means 22 composed of electric wires and power switching devices, for example and receives and transmits power when necessary. Exhaust heat of the electric power generation equipment 1 is transmitted to the hot-water supply apparatus 2 and cold water supply apparatus 3 by supply means 51.

A water tank 11 has water stored therein and is made up with water by supply means 41 as it is needed. Water is conveyed to the hot-water supply apparatus 2 and cold-water supply apparatus 3 by using supply means 61 composed of a pump and piping, for instance.

In the hot-water supply apparatus 2, hot-water is generated by heat-exchange, utilizing exhaust heat, and additional hot-water is generated by burning fuel when the demand of hot-water is large. The generated hot-water is sent to a heat storage tank 30 composed of a tank and an insulating material surrounding the tank by supply means 53, and to the plurality of customers 100, 101, 102.

The cold-water supply apparatus 3 is one of an absorption refrigerating type, for example, and natural gas is used as fuel for supplementing required heat. The generated cold water is sent to a cold storage tank 31 composed of a tank and an insulating material surrounding the tank by supply means 54 and to the plurality of customers 100, 101, 102 by supply means 60.

The quantities of fuel, electricity, hot water and cold water, used by the plurality of customers 100, 101, 102 are measured by automatic measuring or metering apparatus 110, 111, 112, and sent to a controller 80 by communication means 203 comprising signal lines, for example. Operational conditions or states of the electric power generation equipment, hot-water supply apparatus 2, cold-water supply apparatus 3 and system interconnection apparatus 20 are sent to the controller 80 by communication means 204, 205, 206, 207, respectively. Further, a quantity of stored electricity of the electricity storage equipment 21 can be obtained by time-integration of stored current, for example, a stored heat quantity of the heat storage tank 30 can be obtained from a stored water quantity and the water temperature, a cold storage quantity of the cold storage tank 31 can be obtained from a stored water quantity and the water temperature and those information is sent to the controller 80 by communication means 200, 201, 202. Further, the controller 80 can transmit signals of controlling the electric power generation equipment 1, hot-water supply apparatus 2, cold-water supply apparatus 3, system interconnection apparatus 20, electricity storage equipment 21, heat storage tank 30 and cold storage. tank 31 to each apparatus.

Figure 2:
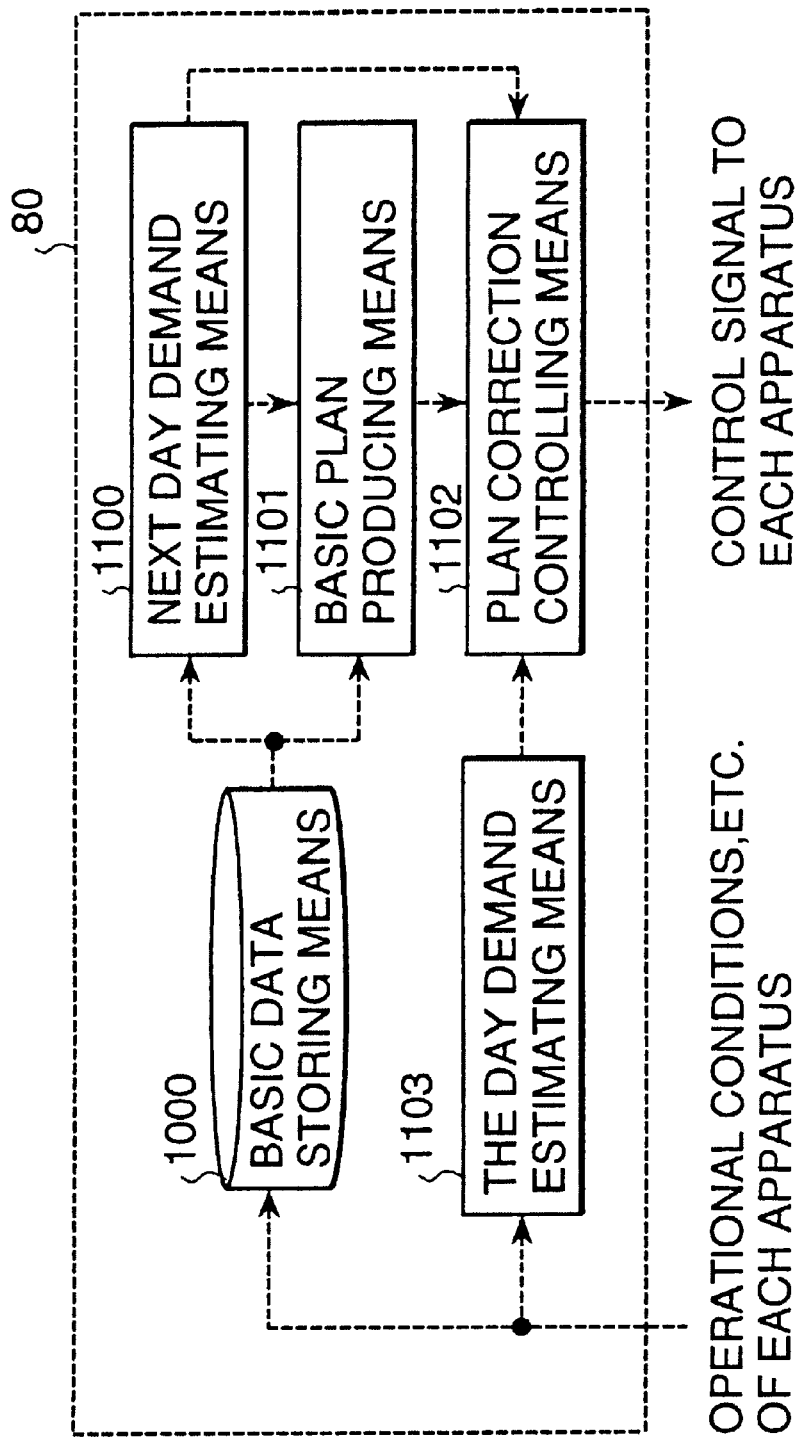
FIG. 2 is a block diagram for explanation of a concrete operation of a controller.

A concrete working of the controller 80 will be described, referring to FIG. 2.

First of all, an operation plan on the next day is made on the day before the operation, in principle. A next day demand estimating means 1100 receives basic data such as actual results of energy supply up to the day before, estimation values of ambient temperatures on the next day, etc. from basic data storing means 1000, and estimates a demand on the next day at intervals of prescribed time, for example, for each 5 minutes. The estimated result is sent to basic plan producing means 1101 and plan correction controlling means 1102. Data necessary in the basic plan producing means 1101, that is, architecture or composition of apparatuses, data of relations between fuel input into the apparatus and output, upper/lower limit value of the apparatus input or upper/lower limit value apparatus output, a fuel cost, an electric power purchase cost, etc. are obtained from the basic data storing means 1000. In the basic plan producing means 1101, an operation plan satisfying a demand on the next day is produced, for example, under the condition that the electric power generation cost is minimized. As a method of minimizing a power generation cost, linear programming, etc, can be used. A concrete optimizing procedure is disclosed in JP A 6-236202, so that it is omitted here. A basic plan of operation produced by the basic plan producing means 1101 is sent to the plan correction controlling means 1102.

On the day of an operation, the-day-demand estimating means 1103 effects demand estimation of a relatively short time, which is effected at intervals of 5 minutes until after 2 hours, for example. In the the-day-demand estimating means, estimation is effected, based on more detailed data such as operational states of respective apparatus, real ambient temperatures and humidity, etc, on the day, so that it is possible to estimate with higher precision than the next day demand estimating means 1100. The plan correction controlling means 1102 corrects the operation basic plan produced on the basis of the next day estimation results of the day before, based on the demand estimation results on the day which is more precise estimation values, converts the corrected results into control signals of respective apparatus, and sends, to respective apparatus, the control signals of controlling start-up, stop, load factors, etc. of the respective apparatus.

Figure 3:
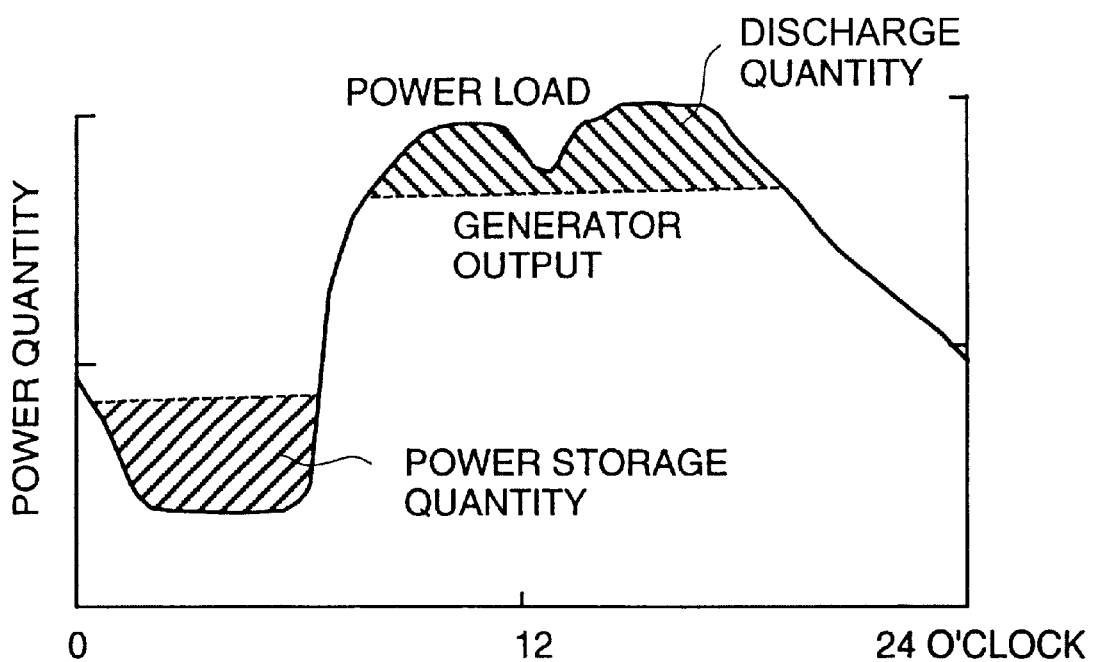
FIG. 3 is graphic illustration for explanation showing an example of a basic plan of operation.
Figure 3:
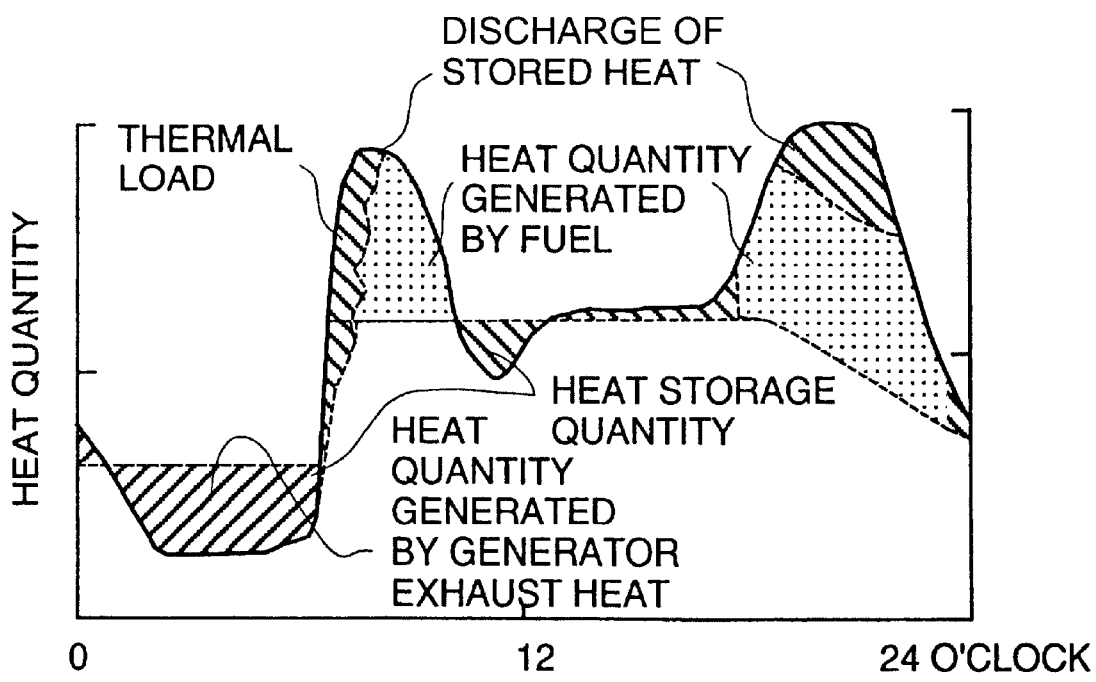

For example, FIG. 3 shows an example of the basic plan of operation in the case where a power generation cost at night is smaller than the sum of a cost of night purchased electric power and a cost required for burning fuel to obtain a heat equivalent to an exhaust heat produced by generation of. an electric power equivalent to the purchased electric power. In this case, a larger power generation output than a power load is kept at night to store excessive power into the electricity storage equipment 21, and the stored power at night is discharged in the daytime, whereby the power load exceeding the maximum power generation is served.

A heat quantity of exhaust heat from the electric power generation equipment is nearly proportional to a power generation output. In this example, a heat quantity of exhaust heat generated from the power generation equipment at night is larger than a heat load and a heat quantity exceeding the heat load is stored into the heat storage tank 30 and discharged in the daytime. In an example of this system, a maximum heat load during a day is larger than a heat quantity exhausted from the power generation system, and the shortage heat quantity is made up by generating heat through burning of fuel. As for cold water, a similar basic plan of operation is produced (not shown in figure).

Figure 4:
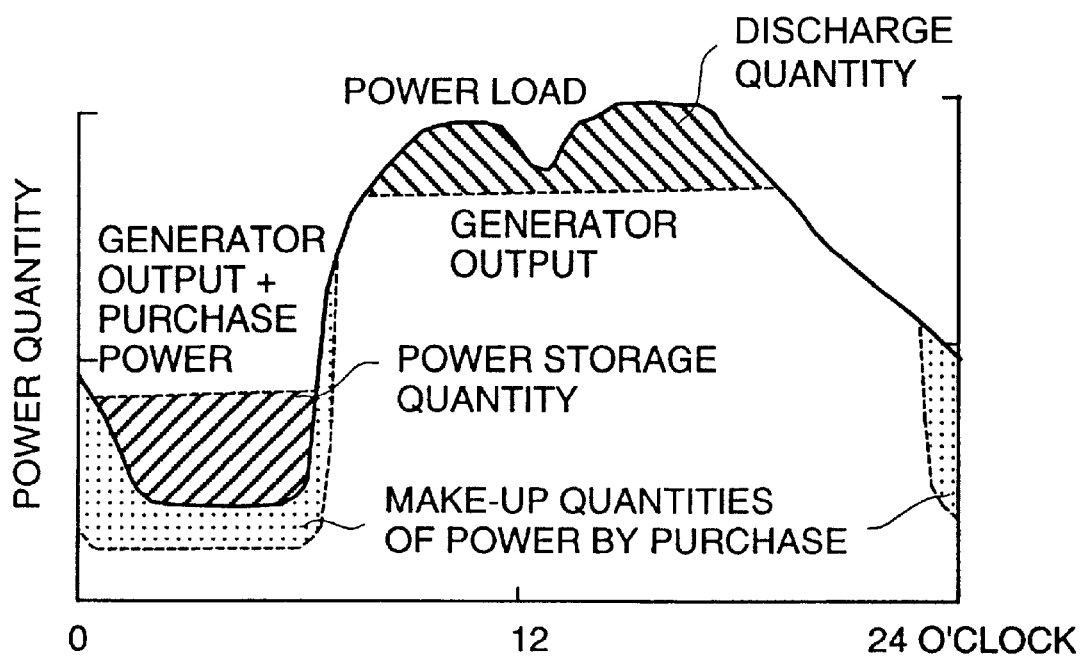
FIG. 4 is graphic illustration for explanation showing another example of the basic plan of operation.
Figure 4:
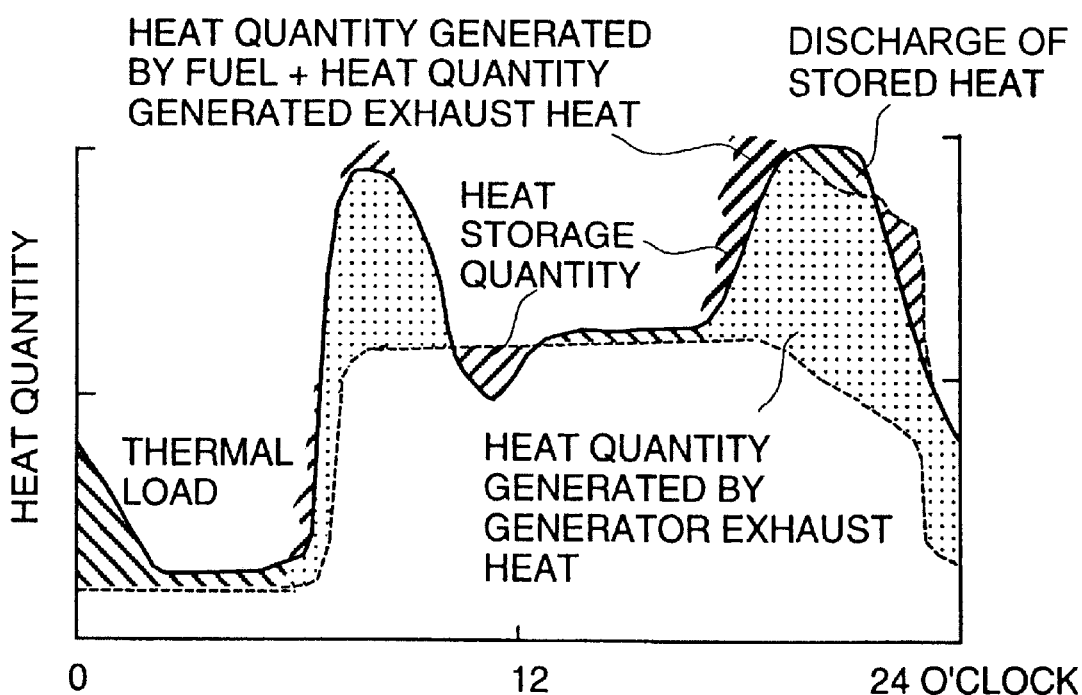

On the contrary, FIG. 4 shows an example of the basic plan of operation in the case where a power generation cost at night is larger than the sum of a cost of night purchased electric power and a cost required for burning fuel to obtain a heat equivalent to an exhaust heat produced by generation of an electric power equivalent to the purchased electric power. In this case, in a time a power generation cost is low, for example, from 23 o'clock at midnight to 7 o'clock in the morning, power generation output is lowered to a lowest level, and a power exceeding the power load is purchased and stored in the electricity storage equipment 21. The stored power is discharged in the daytime , whereby the power load exceeding the maximum power generation output is served. Since the power generation output is lowered to the lowest level, a heat quantity of exhaust heat is small, and a shortage quantity to the heat load becomes larger than in the example shown in FIG. 3, however, that quantity of heat is made up by heat generation through burning fuel. As for cold water, a similar basic plan of operation is produced (not shown in figure).

The above-mentioned plan of operation is an example. that a power generation cost is made minimum, and as an operation plan other than that, it can be produced so as to optimize an environment load or so as to synthetically optimize a power generation cost and an environment load. Concretely, by converting, into a cost, an environment load, for example, a generated amount of carbon dioxides which is the most important greenhouse gas, a plan is made so that the environment cost is made minimum or the sum of the cost and a power generation cost becomes minimum.

As mentioned above, the concrete operations of the controller 80 and the basic plans of operation have been explained, however, they are examples, and the controller 80 can control energy supply so as to optimize a power generation cost or an environment load at that time to cope with a real load without use of the demand estimating means.

In the system managing all the energy necessary for a specific area by one enterprise entity as in the above manner, it is possible to easily supply customers in the specific area with combined energy optimum in respect of a power generation cost and an environment load. By taking such an energy supply type, the necessity for electric transmission of a long distance, for example, is decreased,and it becomes possible to contribute to social cost reduction with respect to energy.

Figure 5:
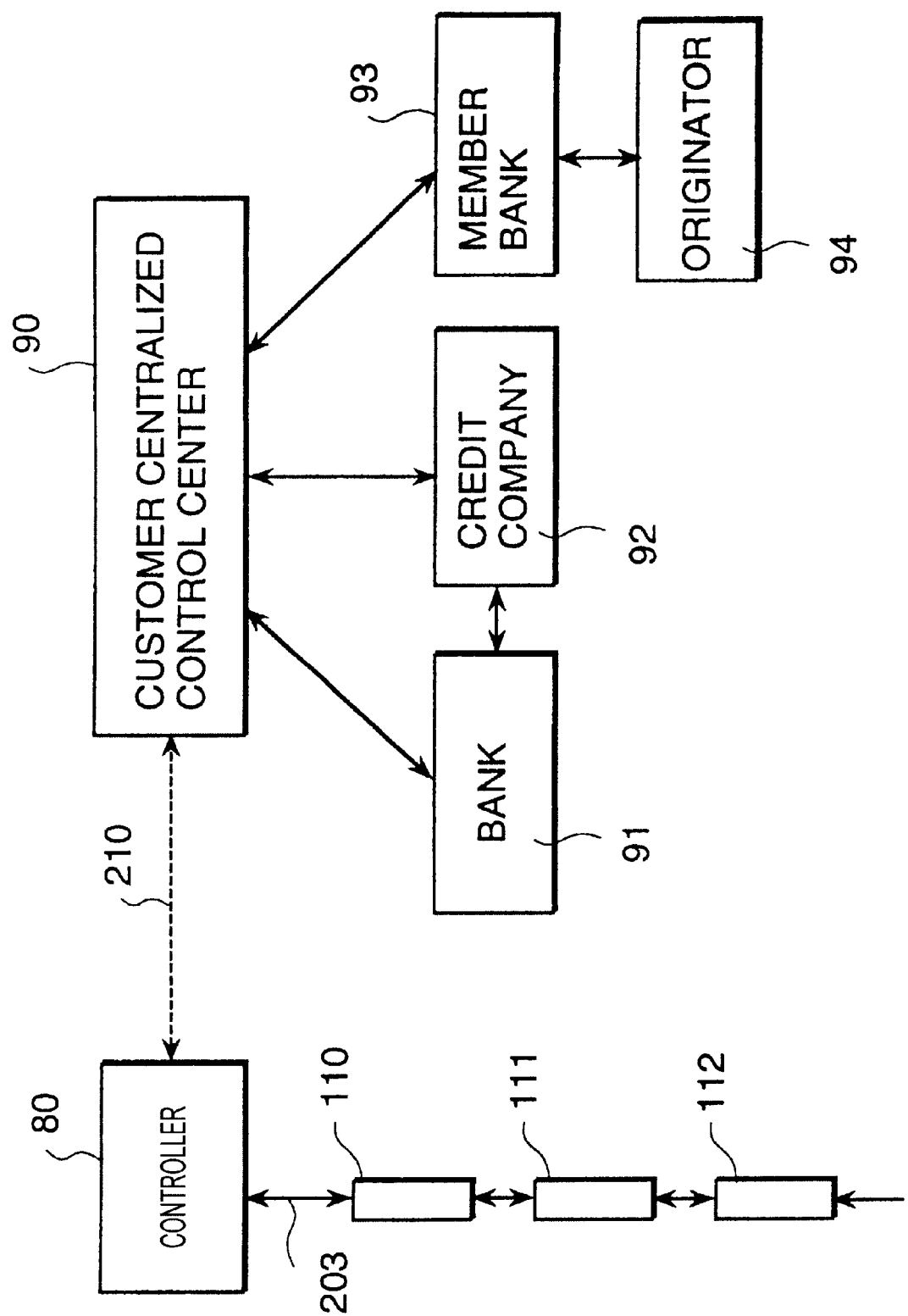
FIG. 5 is a block diagram for explanation of a method of charging to customers.

Further, in the present embodiment, the system is made so that usage of energy such as electric power, hot water, cold water, gas, etc. can be measured for each of a plurality of customers in a specific area, and a concrete charging method is explained, referring to FIG. 5.

A charging system of the present embodiment is composed of a customer centralized control center 90, a bank 91, a credit company 92 which is possible of settlement of accounts with the bank 91, an electric money originator 94 and member banks 93 of the originator.

Information of energy quantities used by customers 100, 101, 102, etc. are measured in the automatic measuring apparatus 110, 111, 112, etc., sent to the controller 80 by communication means 203 and further sent to the customer centralized control center 90. In the customer centralized control center 90, a usage charge is calculated on the basis of a quantity of energy used by each customer 100, 101, 102, taking account of each energy cost, basic fee, etc. and the charge is sent to each customer. As a concrete method of sending a charge to each customer, a 10 method using postal service can be taken, or there can be taken a method of displaying it on the automatic measuring apparatus 110, 111, 112 of each customer by adding an image displaying function to the automatic measuring apparatus 110, 111, 112 and using communication means 210, 203. Each customer 100, 101, 102 notices, to the customer centralized control center 90, which payment method of a usage charge to be taken from payment from a bank 91, payment from the credit company 92 by using a credit card, or payment by electric money from the originator 94 and its 20 member banks 93. A concrete noticing method can be a method using postal services or a method of adding an input function to the automatic measuring apparatus 110, 111, 112 and noticing by using the communication means 203, 210. Further, it is matter of course to be able to take a method in which selection of the payment methods is effected only first time, and then the same payment method is automatically continued.

In this manner, in the present embodiment, it is possible to easily charge in total for all the energy usages of each customer.

In the above-mentioned embodiment, the case where electric power, hot water, cold water and gas are supplied as energy is taken by way of example, however, the present invention is not limited to them or their combination of energy.

For example, the system can be constructed so that electric power, hot water and cold water are supplied in the area in which gas as energy is not needed, electric power, cold water and gas are supplied in the area in which hot water is not needed, electric power, hot water and gas are supplied in the area in which cold water is not needed, electric power, hot water, steam, cold water and gas are supplied in the area in which steam is needed, and electric power, hot water, cold water, chill and gas are supplied in the area in which chill is needed. Further, fuel to be supplied is not limited to one kind, but different kinds of fuel can be taken, that is, fuel to be directly supplied to customers and fuel to be used for power generation system, hot-water supply apparatus, cold-water supply apparatus, etc. can be different in kind from each other. Further, it is possible to construct the system so as to effect centralized control of water to supply with it as in the other energy source, keep trace of a usage charge of each customer and synthetically charge together with usage charges of the other energy.

Further, in the case where it is judged to be advantageous with respective to a power generation cost and an environment load, it is matter of course to be able to provide the following as energy supply equipments, that is, an electric power generation equipment using, as fuel, burnable waste material such as rubbish, sunlight power generation equipment, wind force power generation equipment, fuel battery equipment, electric power generation equipment using a small-sized turbine, ice storage equipment, heat storage equipment using night electric power, hot water/cold water recycling equipment, customer exhaust heat collection equipment using a heat pump, customer discharge water purification/reusing equipment, rainwater purification/using equipment, etc.

In the present embodiment, it is possible to easily provide customers within a specific area with combined energy which is optimum in respect of a power generation s cost and environment cost, and there are effects that an energy cost of customer is reduced and emission of gas green house gas can be suppressed.

Further, it becomes possible to easily charge in a lump for all the usages of customer and there is an effect that time necessary for dealing with them can be largely reduced. Thereby, energy supply business is made efficiently and there is an effect that it can be realized as new business.

Figure 6:
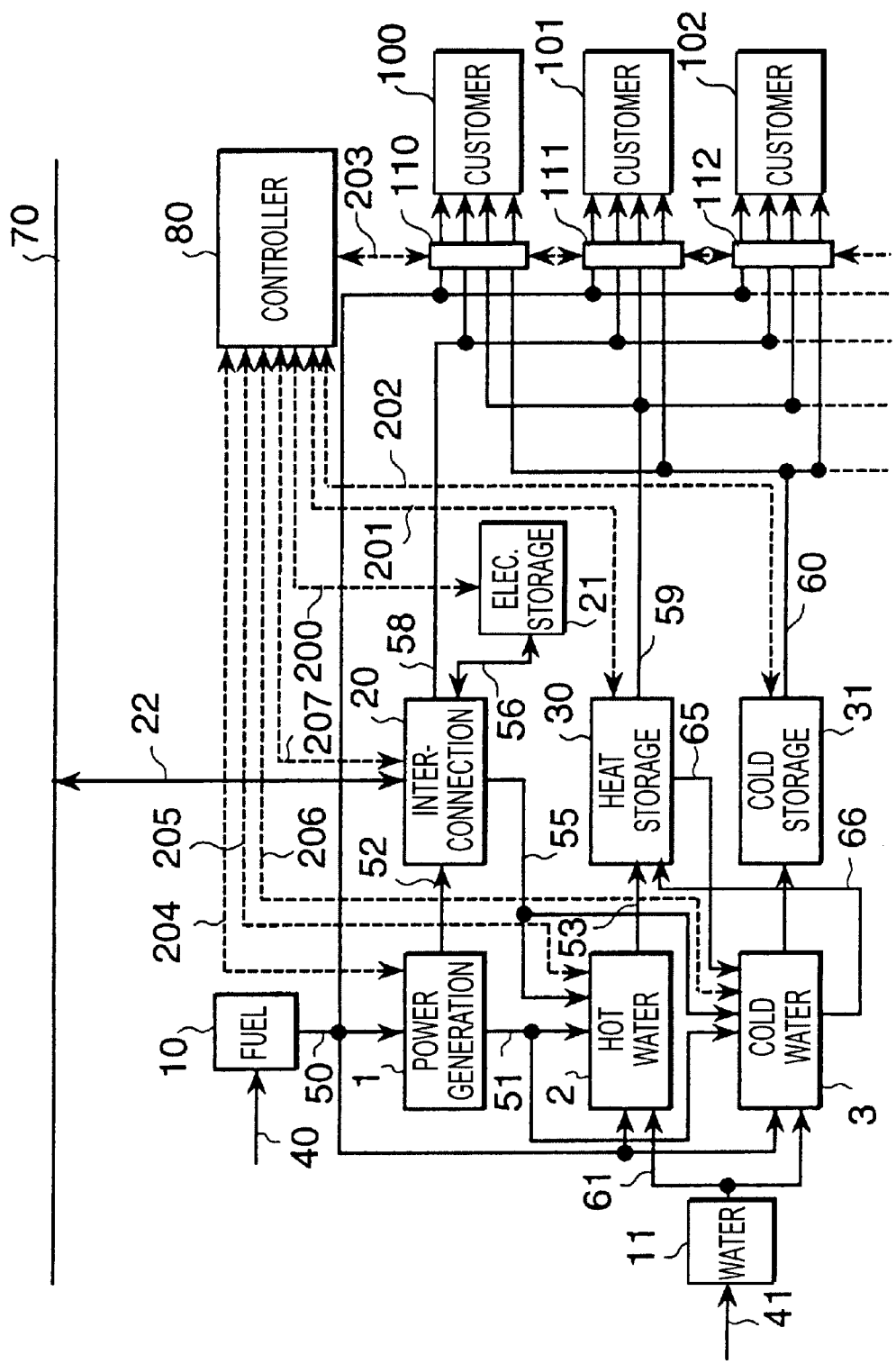
FIG. 6 is a schematic diagram for explanation of a system which is made so that energy can be more effectively utilized by using heat of a heat storage tank and exhaust heat of a cold-water supply apparatus.

Another embodiment of the present invention will be explained, referring to FIG. 6. The present embodiment is made so that hot water in the heat storage tank and exhaust heat from the cold-water supply apparatus are utilized to use more effectively energy.

In the present embodiment, in addition to the embodiment shown in FIG. 1, heat supply means 65 supplying heat from the heat storage tank 30 to the cold-water supply apparatus 3 and exhaust heat supply means 66 for supplying exhaust heat from the cold-water supply apparatus 3 to the heat storage tank 30 are provided. The heat supply means 65, 66 each are composed of a pump and piping, and can be constructed use a heat exchanger to deliver and receive heat the or so as to use a heat pump. In the case where heat stored in the heat storage tank 30 is excessive and electric power generated in the power generation equipment is small, the controller 80 transmits a signal of supplying the cold-water supply apparatus 3 with heat in the heat storage tank 30 to the heat storage tank 30 through the communication means. 201. Thereby, additional heat is transferred to the cold-water supply apparatus 3 by the supply means 65 and a part of energy needed to produce cold water is replaced by the heat, as a result, electric power and fuel used in the cold-water supply apparatus 3 are saved. Since exhaust heat from the cold-water supply apparatus 3 is transferred to the heat storage tank 30 by the supply means 66, energy is used further effectively.

According to the present embodiment, hot water in the heat storage tank 30 and exhaust heat of the cold-water supply apparatus 3 can become utilized effectively, whereby an energy usage efficiency of the system is improved and consumption power of the system can be reduced when heat storage quantity is excessive.

Further another embodiment of the present invention will be described, referring to FIG. 7. The present embodiment is an example that the efficiency of the energy supply system is raised further by controlling a part of energy-using apparatuses of customers.

The present embodiment comprises controllers 130, 131, 132 each controlling energy-using apparatus of each customer and communication means 220 between those controllers and the controller 80, in addition to the embodiment shown in FIG. 1.

Figure 8:
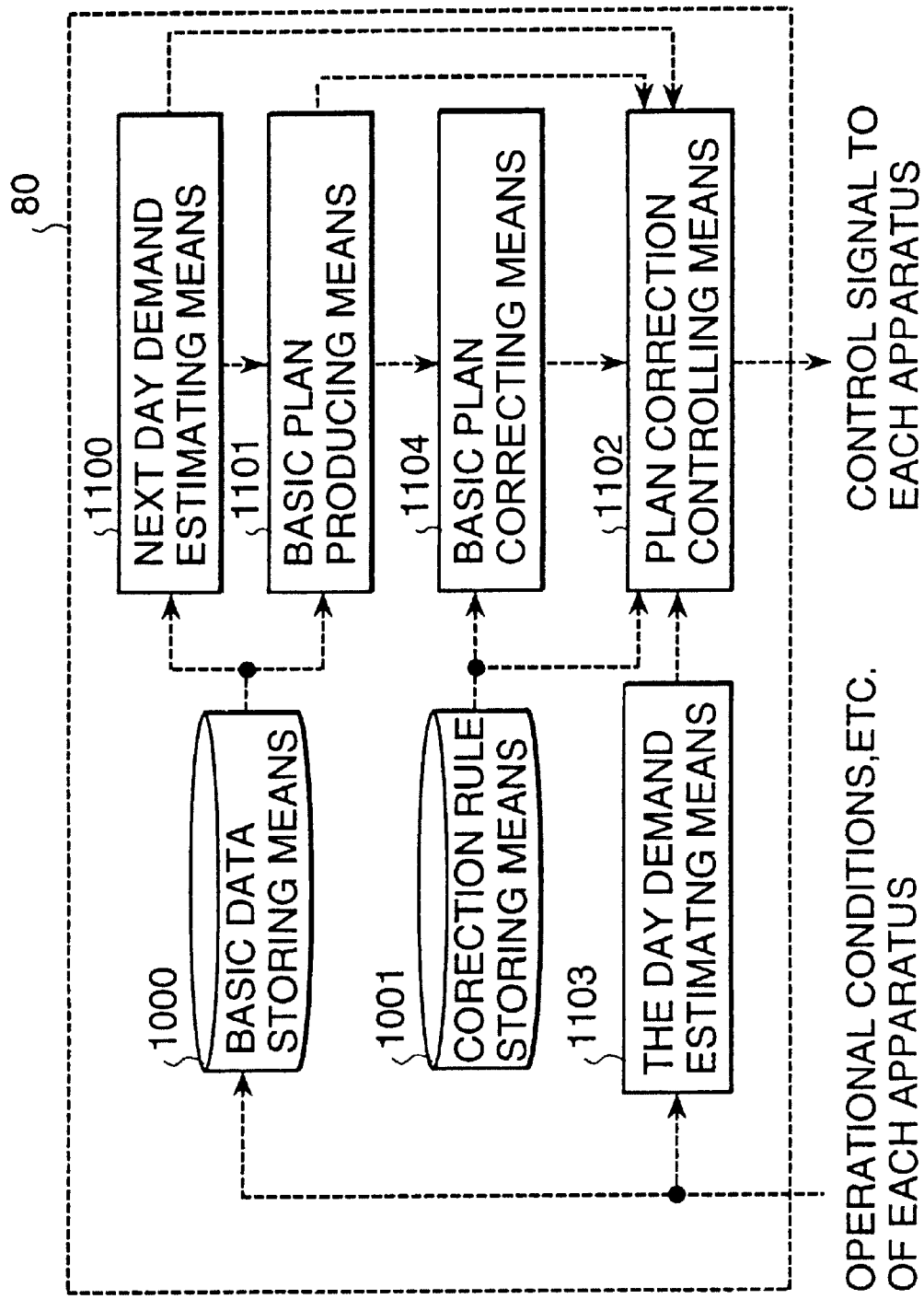
FIG. 8 is a block diagram of a controller showing concrete operations thereof.

The controller 80 of the present embodiment is shown in FIG. 8. In the controller, apparatus compositions of each customer, relational data between input and output of electric power or fuel to the apparatus, upper/lower limit values of input quantities to the apparatus or upper/lower limit values of output quantities, a control target of each customer, operational states of the apparatus, a current value of the control target value, etc, in addition to the functions shown in FIG. 2 are stored in the basic data storing means 1000, and functions of producing operation plans of apparatus of each customer are added to the basic plan producing means 1101. The procedures for producing operation plans of apparatus of each customer are similar to ones in FIG. 2, however, functions of controlling operation of the main power-using apparatus of each customer and lowering an electric power load of the apparatus as much as possible when an electric power load of the whole system is large, for example, is realized by a basic plan correcting means 1104 and a correction rule storing means 1001. The basic plan correcting means 1104 calculates the whole load change on the basis of operation plan of the electric power-using apparatus of each customer, for example, and has a function of shifting operation time of the apparatus having a large electric power load such as a refrigerator at a time that the electric power load of the whole system is large. In the correction rule storing means 1001, rules which are effective for lowering the electric power load, for example, a rule of operating an apparatus even if it does not reach a set value for operating the apparatus when the electric power load of the whole system is small, or a rule of not operating the apparatus though in a short time even if it is over the set value for operating the apparatus when the electric power load of the whole system is large, are stored in addition to the rule of shifting operation time of apparatus from the apparatus which is large in electric power load, prior to the others.

Figure 9:
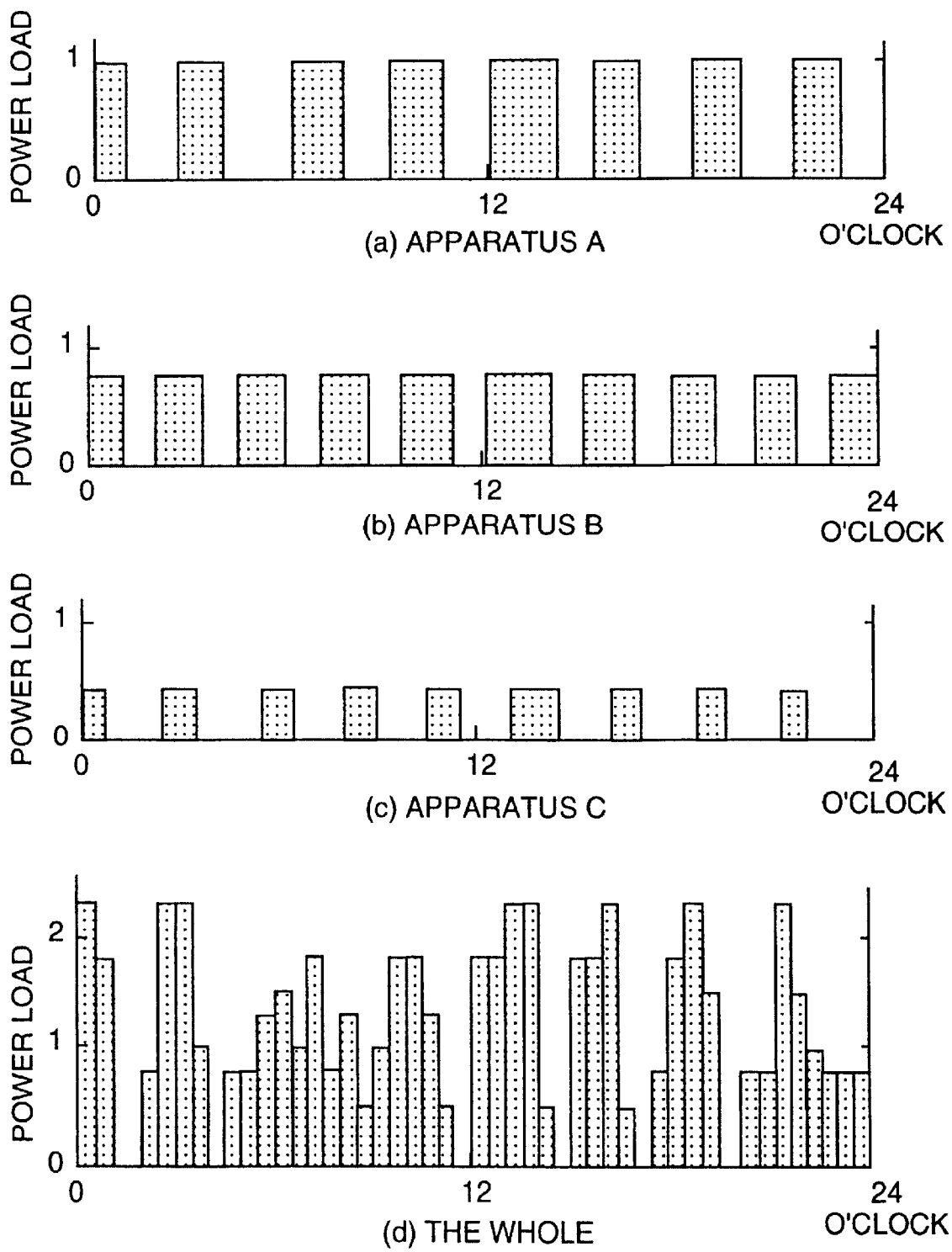
FIG. 9 is graphic illustration for explanation showing a production example of operation plan of apparatus of customers.
Figure 10:
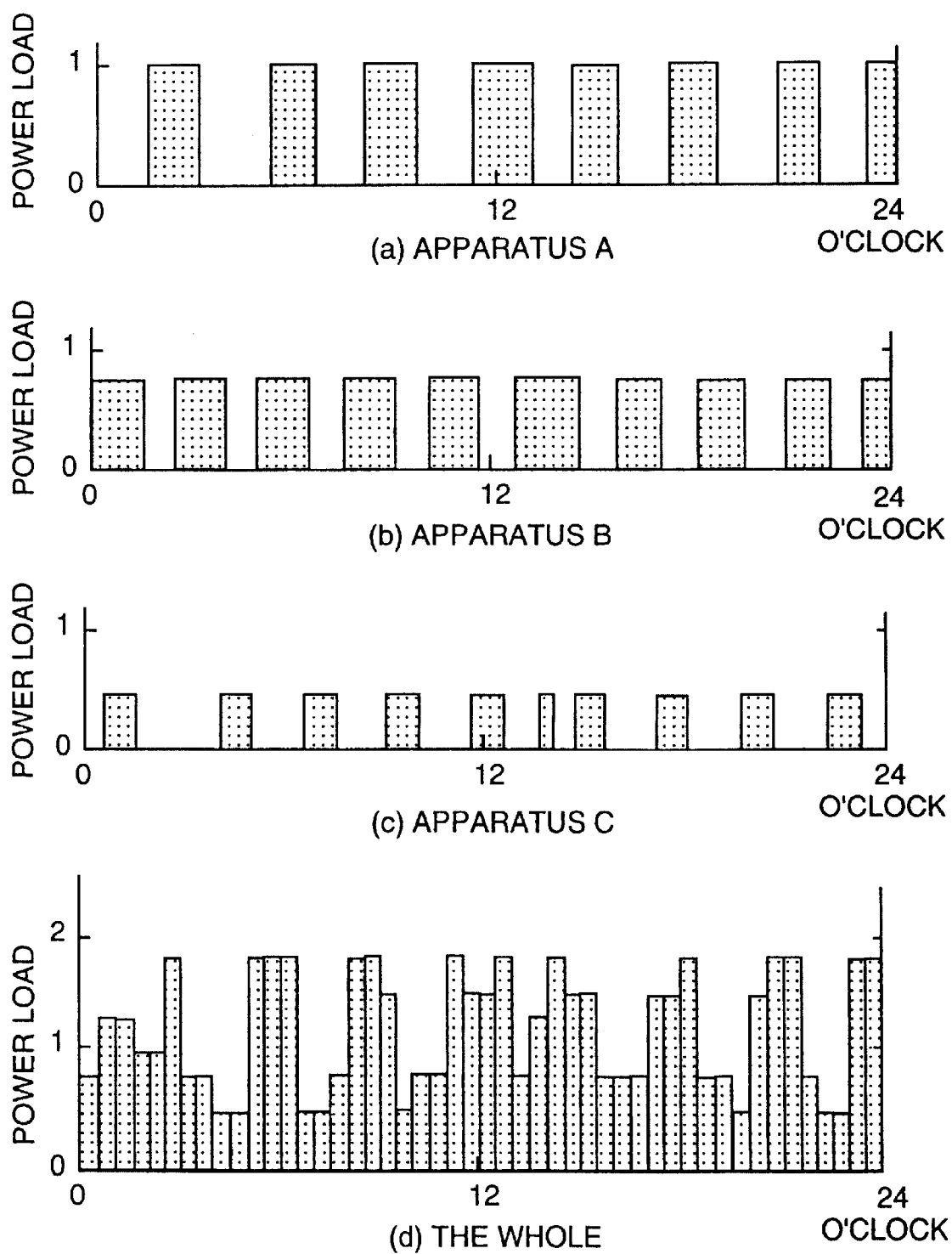
FIG. 10 is graphic illustration for explanation showing a production example of operation plan of apparatus of customers after correction.

An example of production of an operation plan of apparatus of customer 100, 101, 102 according to the present embodiment is explained, referring to FIG. 9 and FIG. 10.

In the basic plan producing means 1101, data such as ambient temperatures on the next day, etc, are obtained from the basic data storing means 1000, and an operation plan on which each apparatus, for example, the refrigerator can achieve a set value of each apparatus, for example, a maximum temperature inside the refrigerator is made. In this step, an operation plan of each apparatus is set independently, for example, as shown in FIG. 9, and there occurs in some cases imbalance such that each of the apparatus A, B, C operates and an electric power load becomes large in a time that the electric power load of the whole energy supply system becomes large, for example, between 13 o'clock and 14 o'clock as shown in FIG. 9, or there occurs a time that each apparatus is not operated. Therefore, in the basic plan correcting means 1104, the operation time of the apparatus A is shifted on the basis of the rule stored in the correction rule storing means 1001, for example, the rule that operation time of the apparatus which is large in electric power load is shifted prior to the others when a total value of electric power loads of respective apparatus is large under the condition that the electric power load of the whole system is large. Further, an operation plan of each apparatus is corrected, applying the rule such that the apparatus is operated even if it does not reach a set value when the whole electric power load is small. It is confirmed by the basic plan producing means 1101 that a prescribed set value can be achieved even if an operation time of each apparatus is shifted. The operation plan corrected in this manner is sent to the plan correction control means 1102. An example of the produced operation plan is shown in FIG. 10. As the. result that such correction is added that an operation time of the apparatus having a large electric power load is shifted prior to the others from the time region in which the electric power load is large, a total value of electric power loads lowers in a time that the electric power load of the whole energy supply system is large, for example, between 13 o'clock and 14 o'clock, as a result, a time region in which each apparatus does not operate becomes zero. In the plan correction controlling means 1102, a part of the operation plan is corrected on the basis of data such as ambient temperatures on the day, and then signals to control each apparatus are sent to the controllers 130, 131, 132. At this time, an operation for suppressing an electric power load is practiced, referring to the rule stored in the correction rule storing means 1001, for example, a rule such that apparatus is not operated even in a short time when an electric power load of the whole system is large.

The above-mentioned embodiment is an example in which the energy-using apparatus of customer is constructed so to be directly controlled and a load is flattened, however, besides this, it is possible to adjust a room temperature of a customer or control timing or quantities of supply of hot water to the bath by directly controlling a plurality of energy-consumption apparatus of customers, for example air conditioners and the hot-water supply apparatus. In this case, it is possible to control more efficiently than controlling apparatus by an individual controller.

According to the present embodiment, since an energy load in a time region in which the energy load of the whole energy supply system becomes large can be reduced by controlling a part of the energy-using apparatus of customer, the efficiency of the energy supply system can be raised, concretely, it is possible to reduce the capacity of electric power generation equipment and capacity of electricity storage in the energy supply system.

Figure 11:
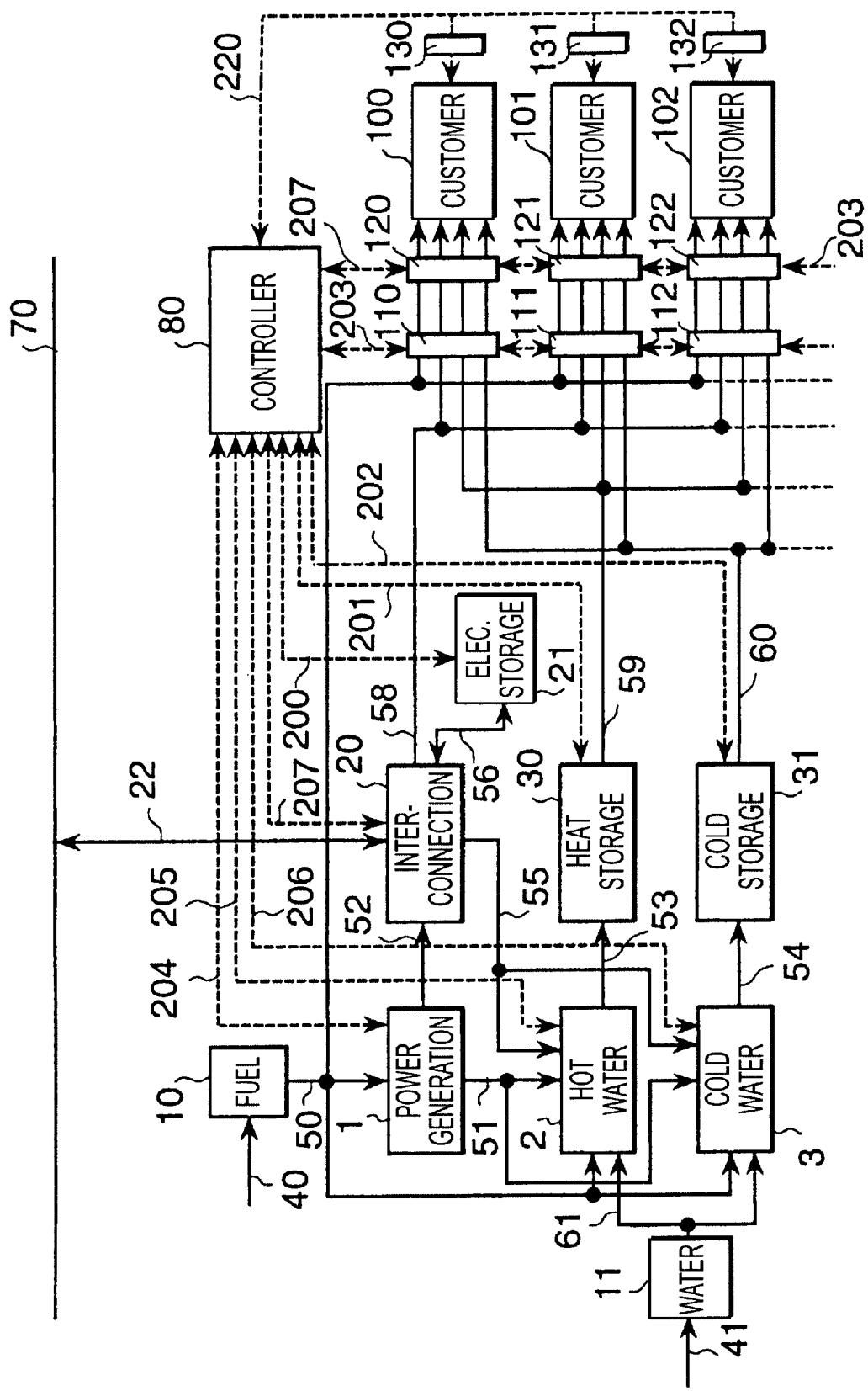
FIG. 11 is a schematic diagram of a system which is made so that energy supply to customers can be adjusted.

Further another embodiment of the present invention is explained, referring to FIG. 11. The present embodiment is made so that supply quantities of energy to customers can not only be measured but also can be adjusted.

Figure 7:
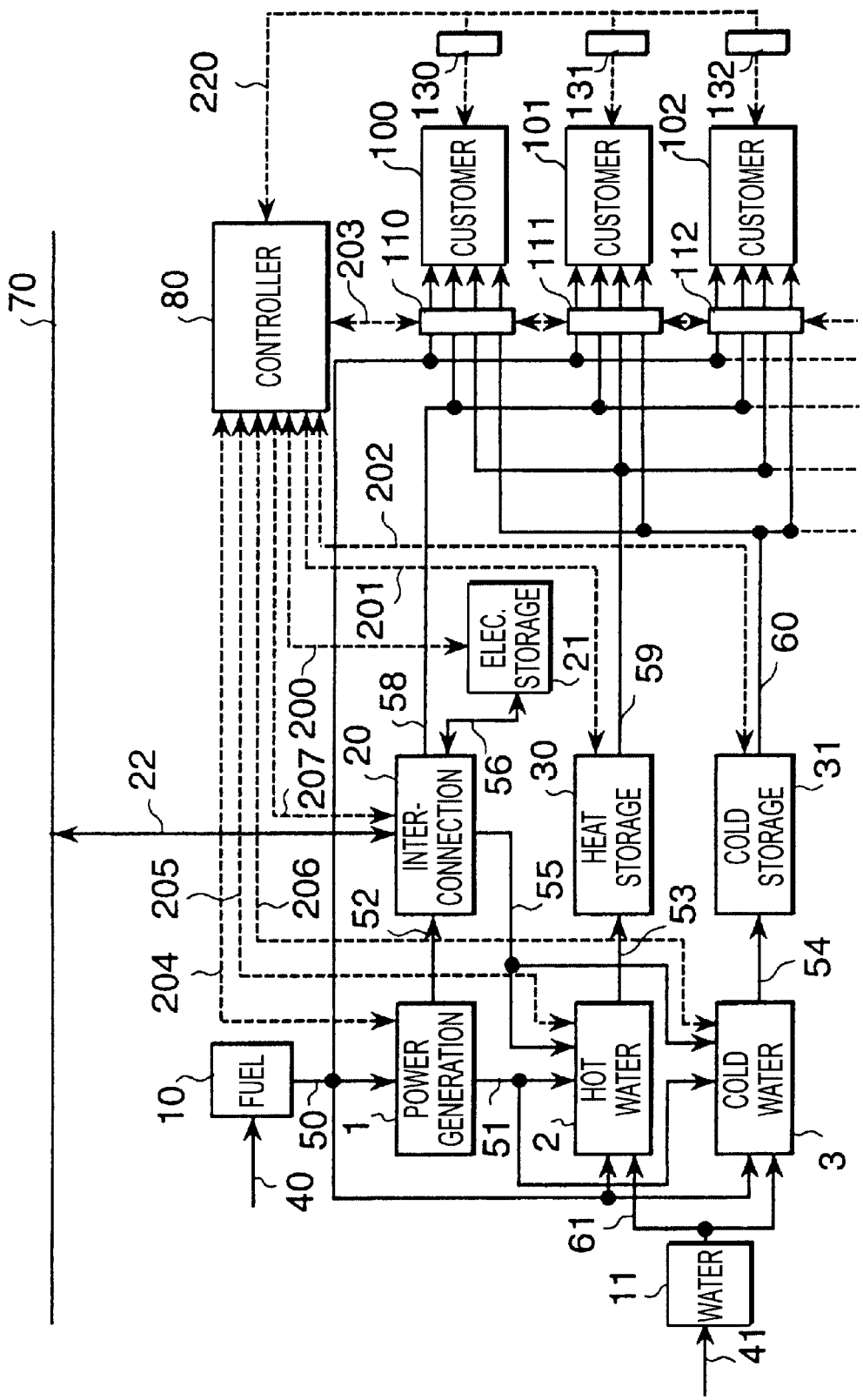
FIG. 7 is a schematic diagram for explanation of a system in which the efficiency is further raised by controlling a part of energy-using apparatus of customers.

In the present embodiment, adjusting means 120, 121, 122 which is able to adjust supply quantities of energy to the customers 100, 101, 102, and communication means 207 for communicating between the adjusting means and the controller 80 are provided in addition to the embodiment shown in FIG. 7. In order to monitor the energy-using apparatus of each customer, for example, a device for detecting gas leakage is arranged in the vicinity of a gas-using apparatus of each customer, and when gas leakage occurs, for example, at the customer 100, it is noticed to the customer 100 by alarm or the like and the occurrence of the gas leakage is communicated to the controller through the controller 130 by communication means 220. In the controller 80, a signal of stopping the gas supply to the customer 100 is sent to the adjusting device 120 by communication means 207, and the adjusting device. 120 makes a supply rate of gas to the customer 100 zero. Thereby, outflow of a lot of gas is prevented and danger such as gas explosion can be avoided.

The above-mentioned embodiment is directed to detection of gas leakage, however, besides this, it also is possible to provide a fire alarm and interrupt supply of gas when a fire occurs, to provide a seismograph and interrupt the supply of gas when an earthquake occurs, or to adjust the supply of the whole energy to the customer on the basis of nonpayment information of the customer.

According to the present embodiment, in the case where any inconvenience occurred by the supply of energy to a customer, it becomes possible to adjust the supply of the corresponding energy to the corresponding customer, for example, it has an effect to prevent gas from flowing out much.

Figure 12:
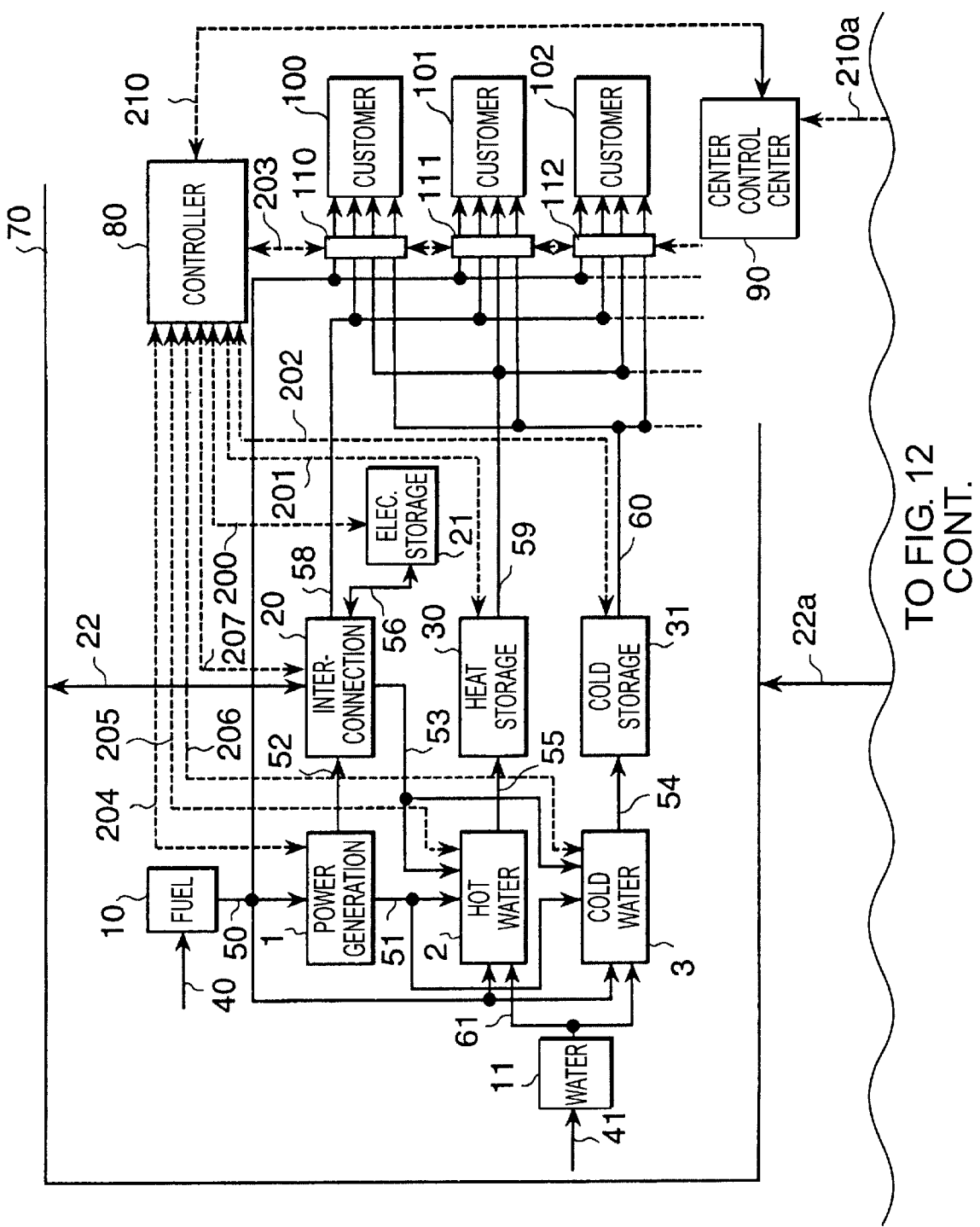
FIG. 12 is a schematic diagram for explanation of a system which is made so that energy accommodation can be effected between a plurality of energy supply systems.
Figure 12:
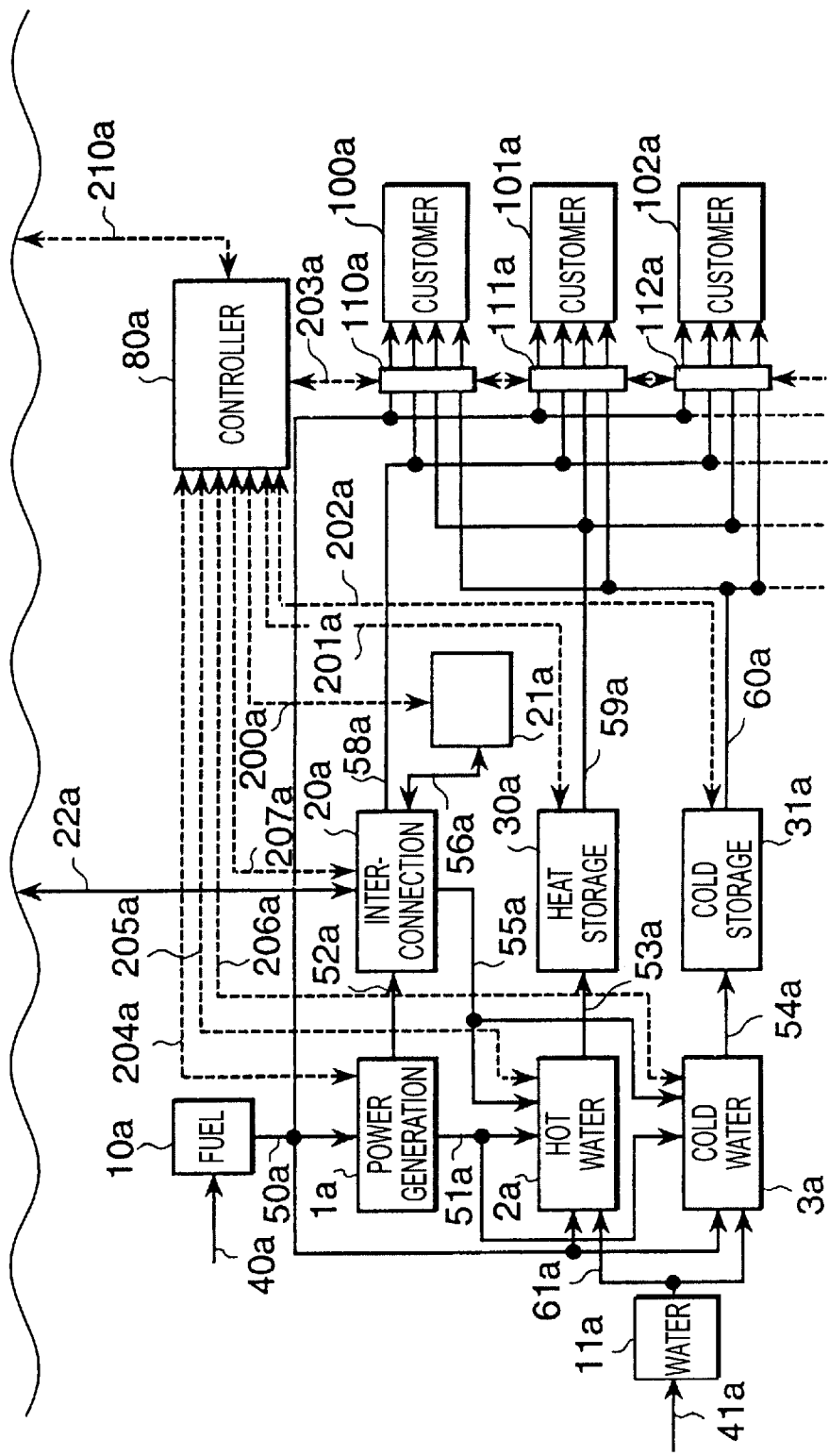

Further another embodiment of the present invention will be described, referring to FIG. 12. In the present embodiment, the customer centralized control center 90 is provided with a function of controlling accommodation of energy between a plurality of energy supply systems.

For example, in some cases, the energy supply system D (on the lower side of FIG. 12) has a capacity left for further power generation in a time region in which the energy supply system U (on the upper side of FIG. 12) becomes short of electric power. In the customer centralized control center 90, in such a case, costs are compared between the case wherein the system U purchases electric power from an electric power company and the case where the system U has electric power sent from the system D which generates the electric power, using a power cable, if the case where the system D generates the electric power and the system U is supplied with energy from the system D is more advantageous in respect of cost, a signal of increasing output of the electric power generation equipment 6a and a signal of sending the electric power from the system interconnection apparatus 20a and receiving it from the system communication system 20 through the power cable 70 are sent to the controller 80a and the controller 80. Thereby, the system U is possible to supply energy at a low cost of power generation as compared with energy supply by a single operation of the system U. Further, in the case where energy is accommodated so that the sum of a cost into which an occurrence amount of carbon dioxides or the like are converted and a cost of power generation becomes lower, it is possible to supply energy optimized in a power generation cost and an environment cost.

Such accommodation also is effective between energy supply systems at two or more stations. Further, such accommodation has a high possibility that it becomes particularly effective when the system u is under regular inspection or under repair, for instance. Further, it is desirable for each system to provide a plurality of power generation systems 1, a plurality of hot-water supply apparatus 2 and a plurality of cold-water supply apparatus 3, for regular inspection and repair. The plurality of power generation systems 1 make it unnecessary to provide additional apparatus such as a transformer or the like by being constructed so as to take different output such as 100V, 200V, 3000V, 6600V, and use them according to uses. Further, the accommodated or circulated energy is not limited to electricity, but it is possible to accommodate hot water, cold water., fuel and water by providing suitable accommodation means, for example, a pump and piping.

According to the present embodiment, there is provided a function of controlling energy accommodation between a plurality of energy supply systems, so that it is possible to supply energy more optimized in respect of power generation cost and environment load as compared with the single operation of the energy supply system.

Figure 13:
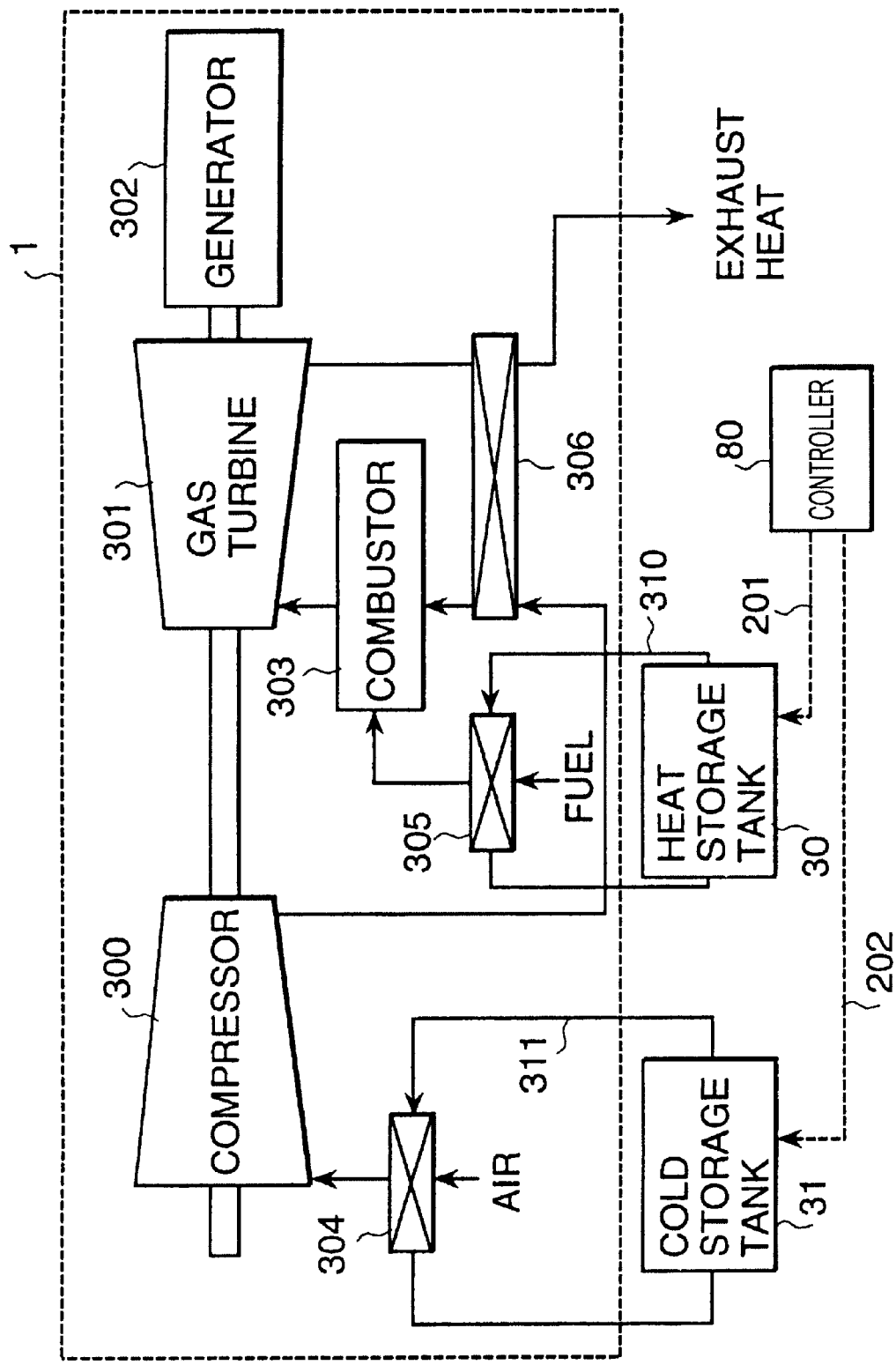
FIG. 13 is a block diagram for explanation of electric power generation equipment which can be made to increase a power generation output by using heat of a heat storage tank and a cold storage tank.

Further another embodiment of the present invention will be described, referring to FIG. 13. The present embodiment is to increase output of power generation by utilizing heat in the heat storage tank and cold storage tank when an electric power load of the whole energy supply systems is large. 2

In the present embodiment, the electric power generation equipment comprises a compressor 300, a gas turbine 301, an electric generator 302, a combustor 303 and heat exchangers 304, 305, 306, and the heat exchanger 304 and cold storage tank 31 are formed so as to be heat exchangeable through supply means 311 and the heat exchanger 305 and the heat storage tank 30 are formed so as to be heat exchangeable through supply means 310. In the case where an electric power load of the whole energy supply system is large and it is necessary to increase output of power generation, the controller 80 sends a signal of supplying cold in the cold storage tank 31 to the heat exchanger 304 by using the supply means 311 and supplying heat in the heat storage tank 30 to the heat exchanger 305 by using the supply means 310 to the cold storage tank 31 by using the communication means 202 and to the heat storage tank 30 by using the communication means 201. Thereby, air flowed in a compressor 300 is cooled by the heat exchanger 304 to be lowered in temperature, whereby the density of air increases so that an air flow rate to be sucked into the compressor increases and as a result, output of the electric generator 302 increases. Further, fuel to be flowed into the combustor 303 is heated by the heat exchanger 305 to rise in temperature, whereby a combustion temperature in the combustor 303 rises, so that output of the electric generator 302 increases further.

Further, the output of power generation increases and the thermal efficiency rises, irrespective of generally the same quantity of fuel.

According to the present embodiment, since the power generation output can be increased by using heat from the heat storage tank and cold storage tank when the electric power load of the whole energy supply systems is large, the system can flexibly cope with to variation of an electric power load.

Figure 14:
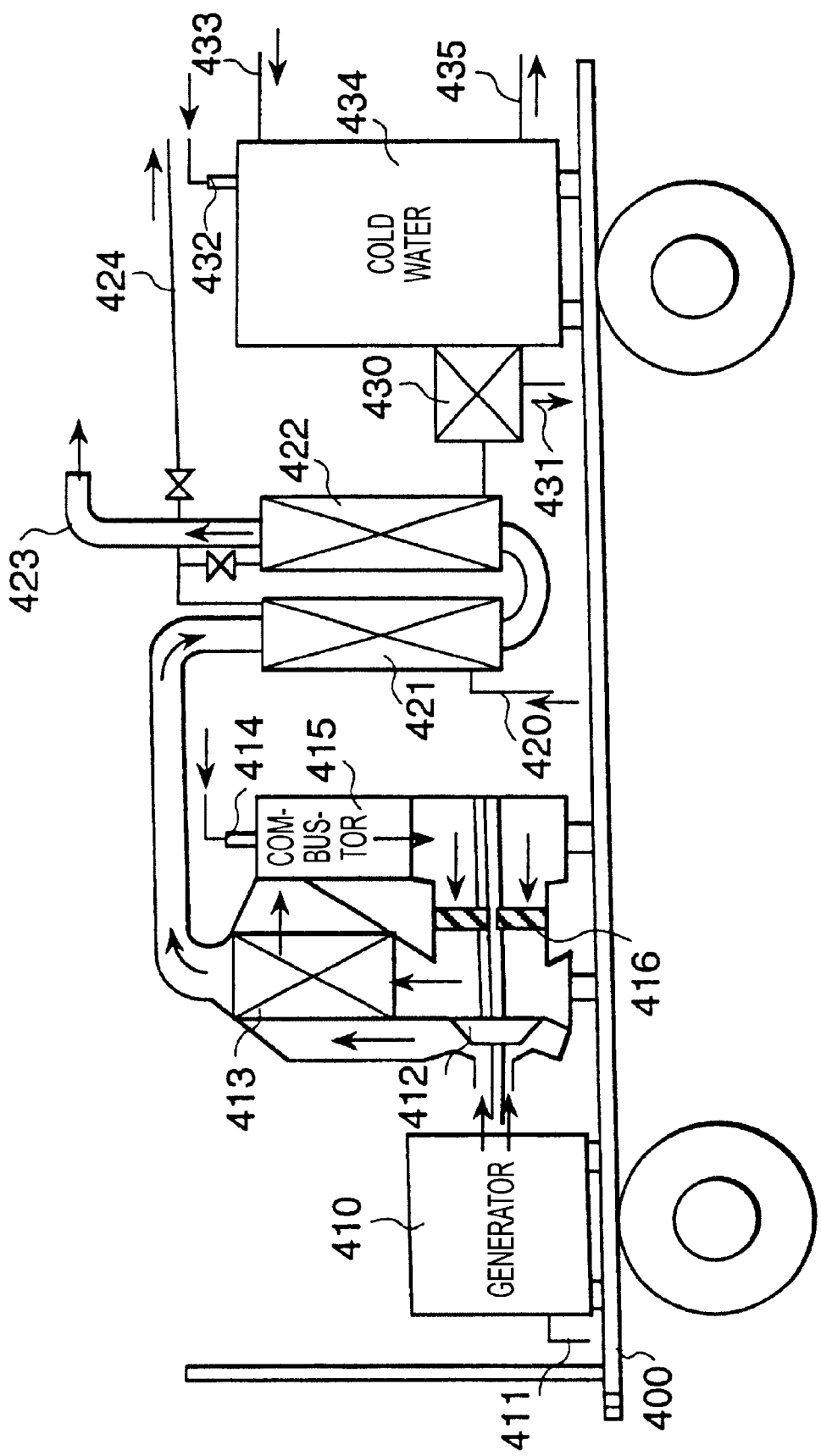
FIG. 14 is a schematic diagram for explanation of a system in which electric power generation equipment, a hot-water supply apparatus and a refrigerator are made movable.

Further another embodiment of the present invention will be described, referring to FIG. 14. The present embodiment makes movable the electric power generation system, hot-water supply apparatus and cold-water supply apparatus, and uses them for backup at a time of regular inspection of the energy supply system.

The present embodiment comprises an electric generator 410, a compressor 412, heat exchangers 413, 421, 422, 430, a combustor 415, a turbine 416, a cold-water supply apparatus 434, etc., for example, each mounted on a trailer 400 of a truck. In the system supplying energy in a specific area, usually, the system has a plurality of series or lines of electric power generation systems, hot-water supply apparatus and cold-water supply apparatus and regular inspection is effected each line or series, whereby power reduction under the regular inspection is suppressed to a necessary and minimum limit. Although there is a method of making up a shortage of energy with energy from the other energy supply system or systems as in the embodiment shown in FIG. 12, the method has a problem that an energy loss becomes large when the distance from the other energy supply system is long. In the present embodiment, the electric generator 410 driven by the turbine 416, hot-water supply equipment comprising the heat exchangers 421, 422, the cold-water supply apparatus, etc are made in compact arrangement and mountable on the car, whereby they can be moved to the energy supply system lowered in output by regular inspection or the like. Fuel is supplied from the fuel tank provided by the energy supply system through supply means 414. Air sucked by the compressor 412 is raised in temperature by the heat exchanger 413, and then flowed into the combustor 415, and mixed with the fuel introduced by the supply means 414 to burn the fuel. The combustion gas drives the turbine 416 and then is flowed into the heat exchanger 421 through the heat exchanger 413. In the electric generator 410, rotational force of the turbine 416 is converted into electricity, and the electricity or electric power is supplied to the energy supply system by the supply means 411. As for the electric generator 410, it is desirable that different generators of output of 100V, 200V, 3000V, 6600V for example are prepared and made changeable according to necessity of backup. Water introduced by the supply means 420 is raised in temperature by exhaust gas in the heat exchanger 421, a part of the water is supplied to the energy supply system by the supply means 424 and the remaining water is further raised in temperature in the heat exchanger, 422, and flowed into the heat exchanger 430 of the cold-water supply apparatus 434 to be absorbed of heat, and then supplied to the energy supply system by the supply means 431. The cold-water supply apparatus 434 is an exhaust heat absorption type gas-firing absorption refrigerator, cools the water introduced by the supply means 433 by using absorbed exhaust heat and fuel introduced by the fuel supply means 432 and supplied to the energy supply system by the supply means 435.

For the movement type energy supply apparatus of the present embodiment, it is matter of course for it to be desirable to jointly use in a plurality of energy supply systems.

According to the present embodiment, since the apparatus for generating energy such as electricity, heat, cold, etc. are made movable, there is an effect that energy can be easily supplied even to an energy supply system which is far away from another energy supply system and positioned in an area in which it is difficult to accommodate energy from another energy supply system, in the case where energy is needed temporarily because of regular inspection or the like.

Figure 15:
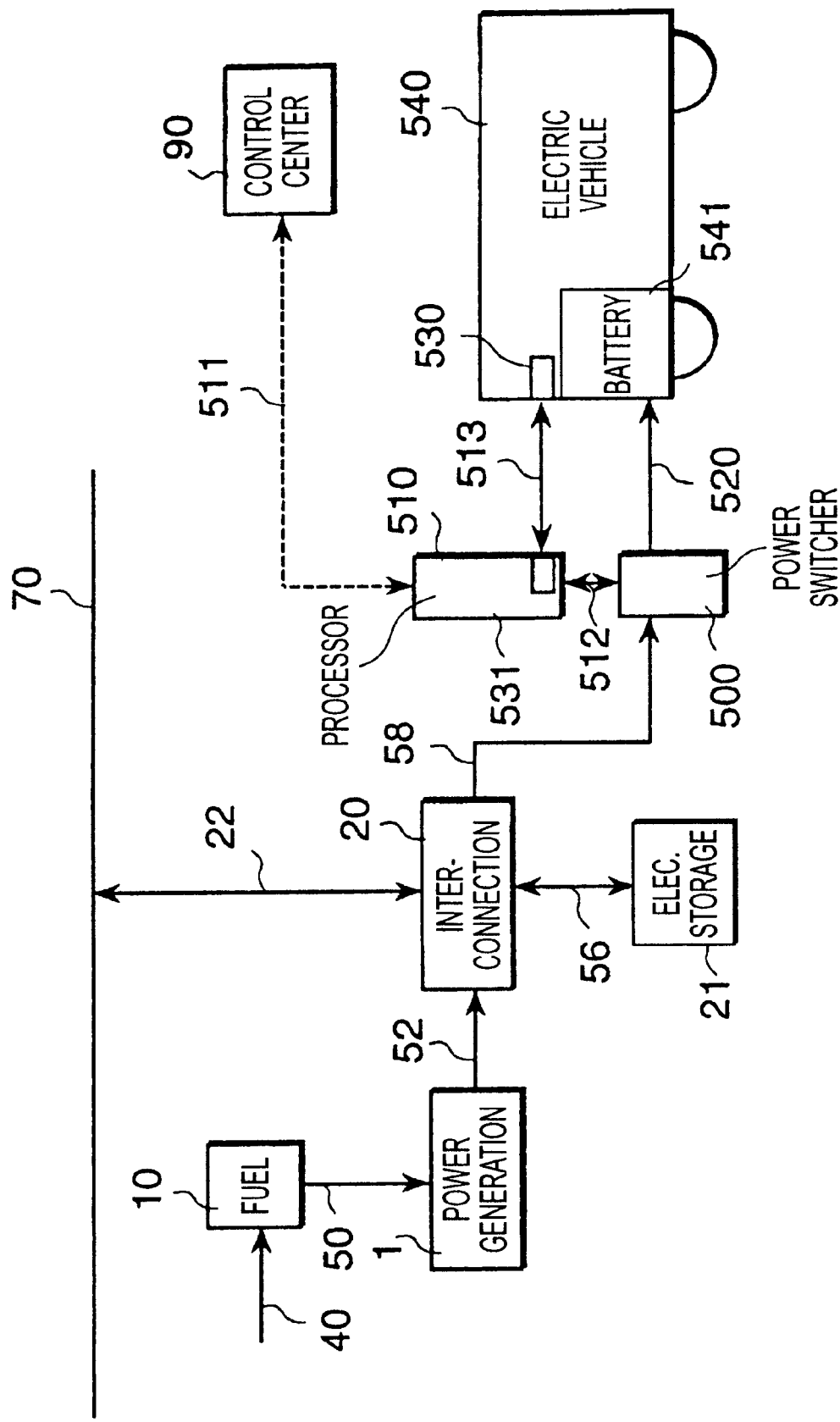
Figure 16:
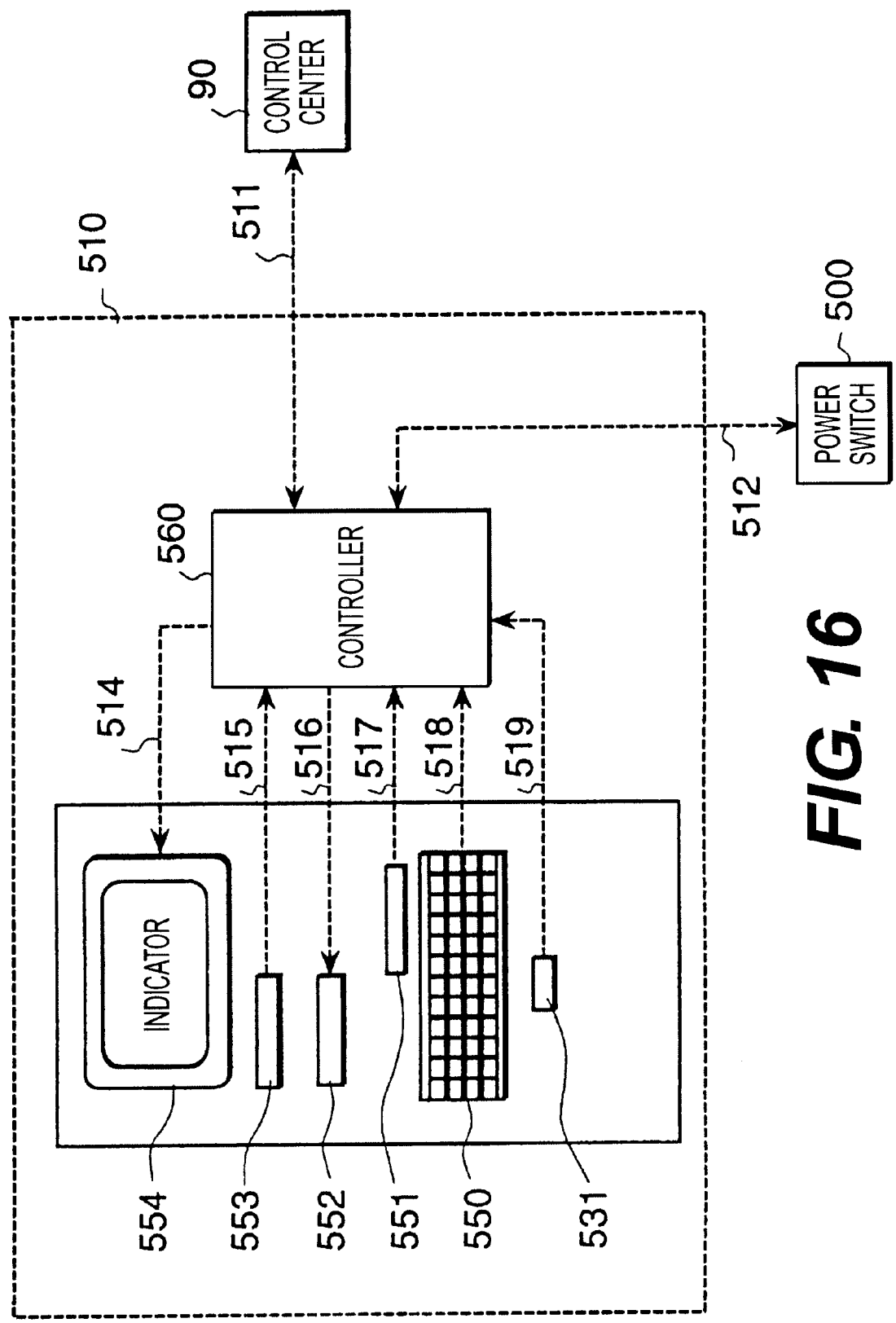
FIG. 16 is a block diagram for explanation of a management unit showing a concrete operation thereof.

Further another embodiment of the present invention will be described, referring to FIG. 15 and FIG. 16. The present embodiment is an energy supply system which is particularly suitable for charging a battery of an electric vehicle or the like.

The present embodiment comprises a power switching device 500, a processing unit 510, transmitters 530 of customers, receivers 531 within the processing unit 510, in addition to the embodiment shown in FIG. 1. An electric vehicle 540 which a customer possesses has a battery 541 mounted thereon, and when it became necessary to charge the battery 541, electricity is charged at an electric stand having a plurality of processing units 510 by supply means 520. When a customer is a contractor of the energy supply system, he has the transmitter 530 transmitting a contract number of the contractor and the signal is received by the receiver 531 provided in the processing unit 510 by wireless communication means 513.

Hereunder, a concrete operation of the processing unit 510 will be explained, referring to FIG. 16. The contract number of the contractor received by the receiver 531 is; sent to a controller 560 by communication means 519, further, sent to the customer centralized control center 90 by the communication means 511. The contractor number of contractor is confirmed in the customer centralized control center, and when the customer number has been confirmed to be sure, a signal having being confirmed is sent to the controller 560. The controller 560 having received the confirmed signal sends a signal of letting the battery 541 of a customer be supplied with electric power to the power switching device 500. The power switching device 500 measures a quantity of electric power having been supplied, and the measured value is sent to the controller 560 by the communication means 512. In the controller 560, a charge is calculated from a supply quantity of power, a power cost, consumption tax rates, etc., sent to an indicating device through communication means 514 to indicate or display it thereon, and at the same time, also sent to the customer centralizing control center 90. Further, in such a case that the transmitter 530 is out of order, it is possible to input the contract number from a keyboard, in this case, it is desirable to input a PIN number or secret number at the same time. An electric power quantity used by a customer is put together with the other energy usage and managed in the customer centralized control center 90, and paid together with charges for the energy usages. In the case where a customer is not a contractor of the energy supply system or in the case where a customer particularly desires, a paying method is input from the keyboard 550. When a credit card or cash card is used, the card is read in a card read out device 551, and when the payment is done by cash, cash is put into a cash reader 553. In the case of card, the card number is sent to the customer centralized control center 90, in which confirmation whether or not the card can be used is made by the bank or credit company which issued the card, and when confirmed, a signal of having been confirmed is sent to the controller 560. Upon finishing of the processing, the controller 560 sends a signal of allowing the customer, battery 541 to be charged with power to the power switching device 500 by the communication means 512. The power switching apparatus 500 measures a quantity of power supply, and the measured value is sent to the controller 560 by the communication means 512.

In the controller 560, a charge is calculated from a supply quantity of power, a power cost, consumption tax rates, etc., sent to the indicating device 554 through the communication means 514 to indicate or display it thereon, and when a card is used, the power usage and charge thereof are sent also to the customer centralizing control center 90, and in the case of cash payment, the balance is calculated, and the balance is returned from a balance returning apparatus 552. Further, it is matter of course to incorporate, into the controller 560, a logic such that power more than the quantity of power corresponding to the input cash is not supplied. According to the present embodiment, since electric power is supplied to customers after a payment means is established, the possibility that electric power is stolen is very small.

In the case where a contractor of the energy supply system run by a certain enterprise charges electricity by using an energy supply system in the other area, run by the same enterprise, it is possible to provide a service that the charge rate is made the same as for the contractors in the area. Further, in order to promote flattening of loads, it is possible to introduce so-called power rates different for each time or each season, that is, when a power load of the whole system is large, the power rate is made higher and when the power load of the whole system is small, the power rates are made small. Further, in the case where a plurality of batteries, for example 2 batteries are prepared and charged and used alternately, a preliminary battery is charged at night when the power load is small, and the preliminary battery is discharged according to necessity when electric power load is large, for example, in the daytime, whereby it is possible to effect further flattening of the power load.

According to the present embodiment, there can be possible such power supply service that payment is possible in a method desired by customers and the possibility of burglary is very small.

According to the present invention, it has an effect that an energy supply system and its operation method in which energy is efficiently supplied to customers and it is made easy to lay hold of energy consumption of each customer in total.

What is claimed is:

1. An energy supply system comprising:
   at least two means selected from means for generating electric power, means for heating a heat conveying medium to an atmospheric temperature or higher and means for cooling a heat conveying medium to the atmospheric temperature or lower;
   means for supplying at least two selected from electric power, heat of atmospheric temperature or higher and cold of atmospheric temperature or lower to a plurality of customers;
   means for measuring supply quantities of electric power, heat and cold, supplied to the plurality of customers;
   means for calculating usage charges for electric power, heat and cold, consumed by each of the customers on the basis of the supply quantities; and
   means for settling the usage charges; and
   wherein said system has at least one means selected from means for storing electric power, means for storing heat and means for storing cold.

2. An energy supply system according to claim 1, wherein means for supplying water to the plurality of customers, means for-measuring quantities of water supplied to the plurality of customers and means for calculating the usage charge for water consumed by each of the customers on the basis of the supply quantity are provided, and the usage charge for water and the other energy usage charges are summed and totally settled.

3. An energy supply system comprising: at least two means selected from means for generating electric power, means for heating a heat conveying medium to an atmospheric temperature or higher and means for cooling a heat conveying medium to the atmospheric temperature or lower;
   means for supplying at least two selected from electric power, heat of atmospheric temperature or higher and cold of atmospheric temperature or lower to a plurality of customers;
   means for measuring supply quantities of electric power, heat and cold, supplied to the plurality of customers;
   means for calculating usage charges for electric power, heat and cold, consumed by each of the customers on the basis of the supply quantities; and
   means for settling the usage charges; and
   wherein exhaust heat produced by said electric power generating means is used as an energy source for at least one of said heating means and said cooling means.

4. An energy supply system comprising:
   at least two means selected from means for generating electric power, means for heating a heat conveying medium to an atmospheric temperature or higher and means for cooling a heat conveying medium to the atmospheric temperature or lower;
   means for supplying at least two selected from electric power, heat of atmospheric temperature or higher and cold of atmospheric temperature or lower to a plurality of customers;
   means for measuring supply quantities of electric power, heat and cold, supplied to the plurality of customers;

means for calculating usage charges for electric power, heat and cold, consumed by each of the customers on the basis of the supply quantities; and means for settling the usage charges; and wherein said system has at least one means selected from means for storing electric power, means for storing heat and means for storing cold.

5. An energy supply system comprising:

at least two means selected from means for generating electric power, means for heating a heat conveying medium to an atmospheric temperature or higher and means for cooling a heat conveying medium to the atmospheric temperature or lower;

means for supplying at least two selected from electric power, heat of atmospheric temperature or higher and cold of atmospheric temperature or lower to a plurality of customers;

means for measuring supply quantities of electric power, heat and cold, supplied to the plurality of customers;

means for calculating usage charges for electric power, heat and cold, consumed by each of the customers on the basis of the supply quantities; and means for settling the usage charges; and wherein exhaust heat generated in said cooling means is used as a part of heat supplied to the customers.

6. An energy supply system comprising:

at least two means selected from means for generating electric power, means for heating a heat conveying medium to an atmospheric temperature or higher and means for cooling a heat conveying medium to the atmospheric temperature or lower;

means for supplying at least two selected from electric power, heat of atmospheric temperature or higher and cold of atmospheric temperature or lower to a plurality of customers;

means for measuring supply quantities of electric power, heat and cold, supplied to the plurality of customers;

means for calculating usage charges for electric power, heat and cold, consumed by each of the customers on the basis of the supply quantities; and means for settling the usage charges; and wherein said system has means for storing heat and means for supplying heat stored in said heat storing means to said cooling means.

7. An energy supply system comprising:

at least two means selected from means for generating electric power, means for heating a heat conveying medium to an atmospheric temperature or higher and means for cooling a heat conveying medium to the atmospheric temperature or lower;

means for supplying at least two selected from electric power, heat of atmospheric temperature or higher and cold of atmospheric temperature or lower to a plurality of customers;

means for measuring supply quantities of electric power, heat and cold, supplied to the plurality of customers;

means for calculating usage charges for electric power, heat and cold, consumed by each of the customers on the basis of the supply quantities; and means for settling the usage charges; and wherein said system has means for storing heat and means for storing cold, and at least one of heat and cold is used as a heat source of or for cooling said power generating means.

8. An energy supply system comprising:

at least two means selected from means for generating electric power, means for heating a heat conveying medium to an atmospheric temperature or higher and means for cooling a heat conveying medium to the atmospheric temperature or lower;

means for supplying at least two selected from electric power, heat of atmospheric temperature or higher and cold of atmospheric temperature or lower to a plurality of customers;

means for measuring supply quantities of electric power, heat and cold, supplied to the plurality of customers;

means for calculating usage charges for electric power, heat and cold, consumed by each of the customers on the basis of the supply quantities; and means for settling the usage charges; and wherein said system controls so that any one of an energy generation cost and a load on environment caused by generation of energy, or the sum of them will be minimum.

9. An energy supply system according to claim 1, wherein a center for managing customer information and a communication means for communication between said center and the customers are provided, and settlement of usage charges for energy of the customers can be selected from payment through a bank, payment by a credit card or electronic money, by said communication means.

10. An energy supply system according to claim 1, wherein means for controlling energy-using apparatus of customers is provided, and operation time of said energy-using apparatus is adjusted so that the sum of energy loads of the respective apparatus becomes small.

11. An energy supply system according to claim 1, wherein means for controlling a plurality of energy-using apparatus of a customer is provided, and said plurality of energy-using apparatus are controlled so as to achieve a control target value set by the customer.

12. An energy supply system according to claim 12, wherein said circulating means is constructed so that at least one of said power generating means, said heating means and said cooling means is mounted on a vehicle and movable thereby.

13. An energy supply system comprising:

at least one means selected from means for generating electric power, means for heating a heat conveying medium to an atmospheric temperature or higher and means for cooling a heat conveying medium to the atmospheric temperature or lower;

means for supplying at least two selected from electric power, heat of atmospheric temperature or higher and cold of atmospheric temperature or lower to a plurality of customers; means for adjusting a quantity of electric power, heat, cold, fuel or water to be supplied to each customer;

means for detecting occurrence of a matter having a possibility that supply of the electric power, heat, cold, fuel or water to the customer induces an undesirable result;

means for adjusting a quantity of at least one of electric power, heat, cold, fuel and water, supplied to the customer is adjusted when said matter occurs;

means for circulating at least one of electric power, heat, cold, fuel and water between a plurality of said energy supply system;

a center for managing information of a plurality of customers;

communication means for communication between said center and the plurality of customers;

means for measuring supply quantities of electric power, heat and cold to the plurality of customers;

means for calculating a usage charge for each customer on the basis of usage;

means for selecting payment of energy to be sold from payment in cash, or payment through a bank, payment by a credit card or electronic money, using said communication means; and means for generating a contractor number of said energy supply system and identifying a contractor of said energy supply system in the case where electric power is purchased from an energy supply system managed by an enterprise entity operating said energy supply system.

14. An energy supply system according to claim 12, wherein said system has power storage means of customers connected for storing electric power and a controller for controlling so as to supply electric power stored in said power storage means of customers when an electric power load exceeds the power generation capacity.

15. A method of operating an energy supply system having at least two means selected from means for generating electric power, means for heating a heat conveying medium to an atmospheric temperature or higher and means for cooling a heat conveying medium to the atmospheric temperature or lower, means for supplying at least two selected from electric power, heat of atmospheric temperature or higher and cold of atmospheric temperature or lower to a plurality of customers, a center for managing information of a plurality of customers, and communication means for effecting communication between the center and the plurality of customers, comprising the steps:

receiving, through said communication means, a contract number of a customer identifying a contractor of the energy supply system, and supplying the customer with energy when the received contract number of the customer is confirmed to be the contractor of the energy supply system.

16. A method of operating an energy supply system according to claim 15, further comprising the steps:

measuring amounts of electric power, heat and cold, supplied to a plurality of customers;

calculating a usage charge for each customer on the basis of usage, and settling the usage charge.

* * * * *